(12) United States Patent
Ooguri

(10) Patent No.: US 8,650,370 B2
(45) Date of Patent: Feb. 11, 2014

(54) DATA STORING METHOD AND DATA STORING SYSTEM

(75) Inventor: Noboru Ooguri, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 254 days.

(21) Appl. No.: 12/834,476

(22) Filed: Jul. 12, 2010

(65) Prior Publication Data

US 2011/0022810 A1   Jan. 27, 2011

(30) Foreign Application Priority Data

Jul. 21, 2009 (JP) ................................. 2009-170473

(51) Int. Cl.
*G06F 12/00* (2006.01)
(52) U.S. Cl.
USPC .................... 711/161; 711/E12.018; 711/216
(58) Field of Classification Search
USPC ........................................................ 711/216
See application file for complete search history.

(56) References Cited

U.S. PATENT DOCUMENTS

| | | | | |
|---|---|---|---|---|
| 8,074,047 | B2 * | 12/2011 | Abali et al. | 711/206 |
| 2003/0208599 | A1 * | 11/2003 | Asano et al. | 709/226 |
| 2006/0248195 | A1 | 11/2006 | Toumura et al. | |

FOREIGN PATENT DOCUMENTS

| | | |
|---|---|---|
| JP | 9-330263 A | 12/1997 |
| JP | 2003-524243 A | 8/2003 |
| JP | 2006-309383 A | 11/2006 |
| WO | WO-01-61563 A1 | 8/2001 |

OTHER PUBLICATIONS

Japanese Office Action mailed Apr. 19, 2011, for corresponding Japanese Application No. 2009-170473, with English-language Translation.

* cited by examiner

*Primary Examiner* — Reginald Bragdon
*Assistant Examiner* — Hamdy S Ahmed
(74) *Attorney, Agent, or Firm* — Fujitsu Patent Center

(57) ABSTRACT

A non-transitory computer-readable medium storing an data storing program executed by an archive device including a first storage unit for storing data and a second storage unit for storing hash value determined from the data, the program causing the archive device to execute a process includes receiving hash value determined from data to be stored from an external device which requests storage of the data, comparing the received hash value with the hash value stored in the second storage unit, and transmitting request information for transmitting the data corresponding to the received hash value to the external device which transmits the hash value when the received hash value has not been stored in the second storage unit.

12 Claims, 17 Drawing Sheets

| ARCHIVE ID | HASH VALUE | DATA CAPACITY (MB) | STORAGE PATH | ... |
|---|---|---|---|---|
| 001 | 1456 | 100 | /data/1 | ... |
| 002 | 2789 | 20 | /data/2 | ... |
| ... | ... | ... | ... | ... |
| ... | ... | ... | ... | ... |

| ARCHIVE ID | HASH VALUE | | | | | STORAGE PATH | DATA CAPACITY (MB) | ... |
|---|---|---|---|---|---|---|---|---|
| | 1MB | 2MB | ... | nMB | ... ENTIRE DATA | | | |
| 001 | 1111 | 1222 | ... | 1136 | ... 1456 | /data/1 | 100 | ... |
| 002 | 2222 | 2333 | ... | 2269 | ... 2789 | /data/2 | 20 | ... |
| ... | ... | ... | ... | ... | ... ... | ... | ... | ... |
| ... | ... | ... | ... | ... | ... ... | ... | ... | ... |

FIG. 15

| EXTERNAL DEVICE | SINGLE INSTANTIATION RATIO (%) |
|---|---|
| BUSINESS SERVER A | 90 |
| BUSINESS SERVER B | 30 |
| ... | ... |
| ... | ... |

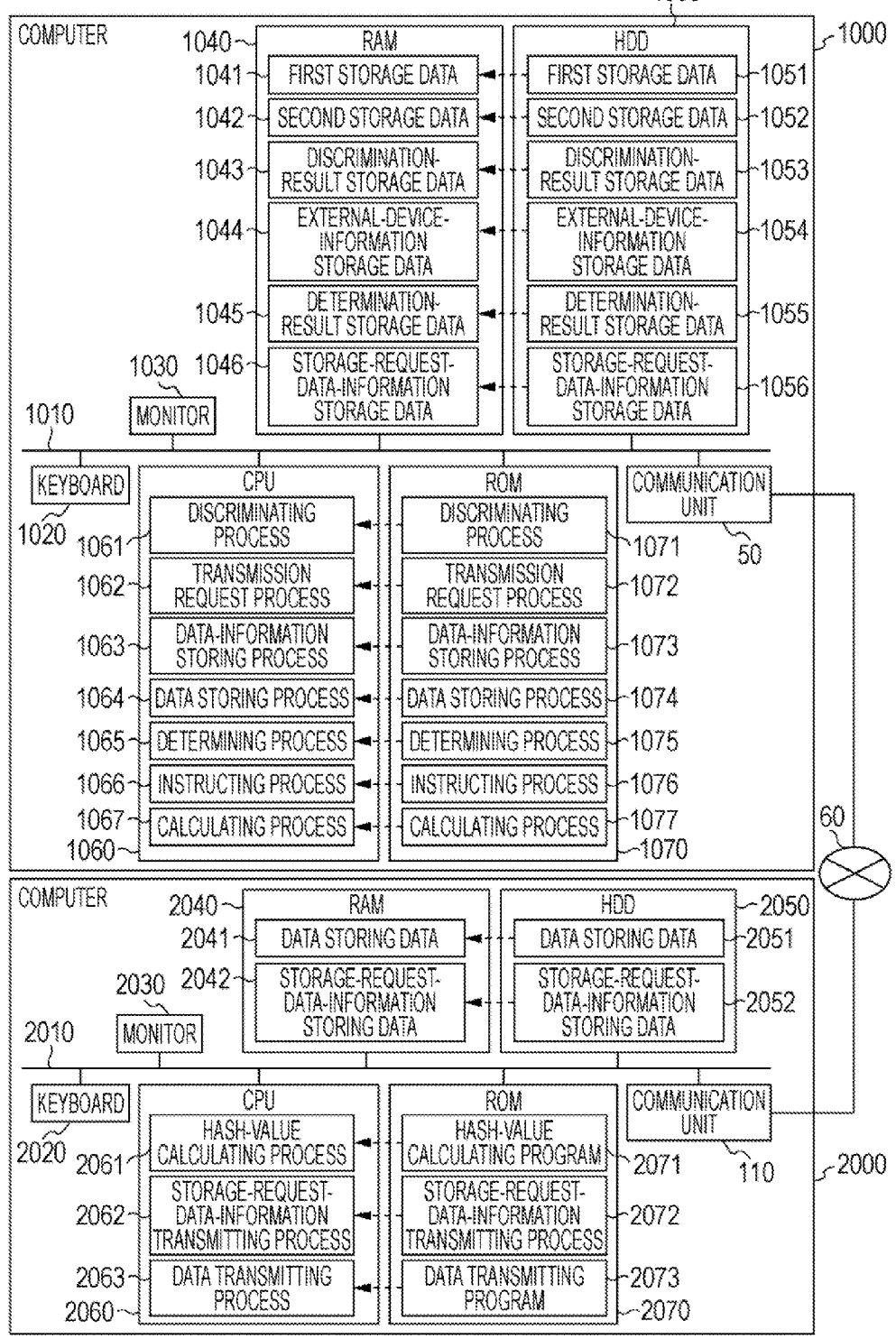

DATA STORING METHOD AND DATA STORING SYSTEM

CROSS-REFERENCE TO RELATED APPLICATION

This application is based upon and claims the benefit of priority of the prior Japanese Patent Application No. 2009-170473, filed on Jul. 21, 2009 the entire contents of which are incorporated herein by reference.

FIELD

The embodiments discussed herein are related to a data storing program.

BACKGROUND

In general, an archive device has been used for storing digital content such as music, movies, electronic mails, medical images, and document data in an integrated manner for a long period of time. The archive device is connected to a plurality of external devices through a network, stores various digital content (hereinafter referred to as "data") received from the external devices, and transmits the stored data to the external devices in accordance with reference requests externally supplied.

Specifically, the archive device includes a plurality of storage devices (such as a disk array and a tape library) and a processor which performs a writing process to the storage devices and a reading process from the storage devices. The processor writes data supplied from the external devices to the storage devices. At this time, the processor generates metadata (such as a reception date, a transmission source, and a storage place) for the received data and stores the metadata. Then, the processor refers to the metadata in accordance with a reference request issued by a user, reads data corresponding to the metadata from one of the storage devices, and transmits the data to one of the external devices.

Note that the archive device has a single instance function of preventing storage of the same data so that data which has been stored is not stored again. Specifically, the archive device stores property information which is obtained by associating a hash value calculated from data which has been stored and a data capacity of the data for each data. Then, the archive device calculates a hash value of data which is newly requested to be stored, and determines whether the same data has been stored by comparing the calculated hash value and a data capacity of the data which is requested to be newly stored with the property information stored therein.

For example, when newly receiving data having a hash value and a data capacity which are the same as those stored as property information of the archive device, the archive device does not store the data but generates metadata of the data and stores the metadata associated with the property information.

Furthermore, in recent years, an archive device which allows a recording medium which stores data to be removed as a portable recording medium so that load applied to a network at a time of data transmission and load applied to the archive device when data is copied are reduced has been known (refer to Japanese Laid-open Patent Publication No. 09-330263).

In the related art described above, there arises a problem in that a process of storing data is not smoothly performed. Specifically, in the related art described above, the archive device calculates a hash value when data is to be stored, and therefore, in a case where a plurality of external devices request storage of data, for example, load applied to a CPU of the archive device is increased, and accordingly, the process of storing data is not smoothly performed.

Furthermore, in the related art described above, in a case where it is determined that data requested to be stored using the single instance function has been already stored, transmitted data is discarded. Therefore, the load applied to the network is increased owing to an unnecessary data transmission.

SUMMARY

According to an aspect of the invention, a non-transitory computer-readable medium storing an data storing program executed by an archive device including a first storage unit for storing data and a second storage unit for storing hash value determined from the data, the program causing the archive device to execute a process includes receiving hash value determined from data to be stored from an external device which requests storage of the data, comparing the received hash value with the hash value stored in the second storage unit, and transmitting request information for transmitting the data corresponding to the received hash value to the external device which transmits the hash value when the received hash value has not been stored in the second storage unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 15 is a diagram illustrating an external-device-information storage unit;

FIG. 20 is a diagram illustrating a computer which performs a data storing program according to the fourth embodiment.

DESCRIPTION OF EMBODIMENTS

Embodiments of a data storing program, a data storing method, and a data storing system disclosed in this application will be described in detail with reference to the accompanying drawings. Note that, hereinafter, an archive device which performs the data storing program disclosed in this application will be described in a first embodiment, the data storing system disclosed in this application will be described in second to fourth embodiments.

First Embodiment

Figure 1:
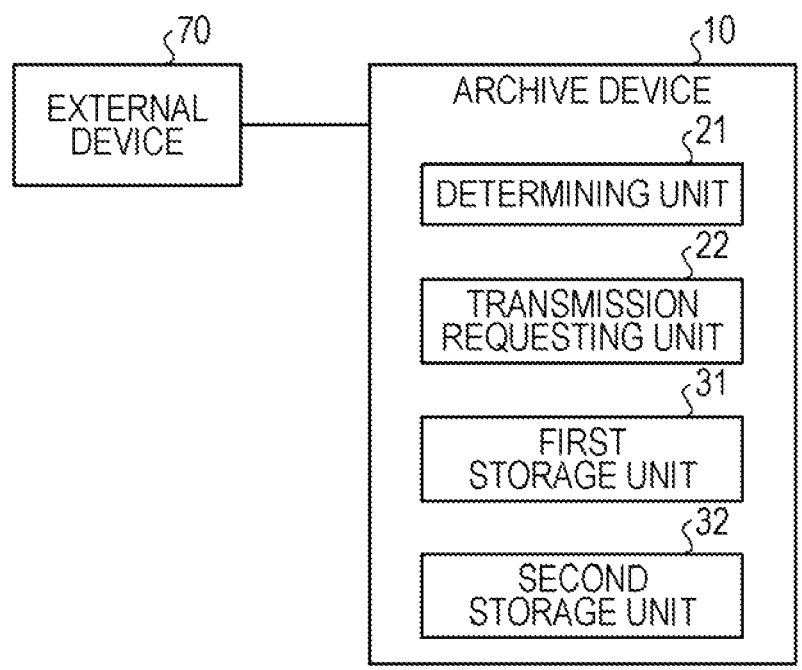
FIG. 1 is a diagram illustrating a configuration of an archive device according to a first embodiment.

First, a configuration of the archive device according to a first embodiment will be described with reference to FIG. 1. FIG. 1 is a diagram illustrating a configuration of an archive device 10 according to the first embodiment.

As illustrated in FIG. 1, the archive device 10 according to the first embodiment includes a discriminating unit 21, a transmission requesting unit 22, a first storage unit 31, and a second storage unit 32, and is connected to an external device 70.

The external device 70 is connected to the archive device 10 through a network, not illustrated, and transmits a request for storing data to the archive device 10.

The first storage unit 31 stores data which has been stored in the archive device 10 in accordance with the data storage request supplied from the external device 70.

The second storage unit 32 stores data information including a hash value of data to be stored and a data capacity of the data which are associated with each other, when the archive device 10 stores the data in the first storage unit 31 in accordance with the data storage request supplied from the external device 70.

The discriminating unit 21 receives storage-request-data information including a hash value and a data capacity of data supplied from the external device 70 which requests storage of the data, and determines whether data information the same as the received storage-request-data information has been stored in the second storage unit 32.

Only when the discriminating unit 21 determines that the same data information has not been stored, the transmission requesting unit 22 requests the external device 70 to transmit data corresponding to the storage-request-data information to the first storage unit 31 so that the data is stored in the first storage unit 31.

Effect of First Embodiment

As described above, according to the first embodiment, when data is to be stored in the first storage unit 31 in accordance with a data storage request supplied from the external device 70, the second storage unit 32 stores data information including a hash value of the data to be stored and a data capacity of the data which are associated with each other. Then, the discriminating unit 21 receives storage-request-data information including a hash value and a data capacity of data from the external device 70 which requests storage of the data, and determines whether data information the same as the received storage-request-data information has been stored in the second storage unit 32. Then, only when the discriminating unit 21 determines that the same data information has not been stored, the transmission requesting unit 22 requests the external device 70 which has transmitted the storage-request-data information to transmit data corresponding to the storage-request-data information to the first storage unit 31 so that the first storage unit 31 stores the data. Accordingly, only when it is determined that the data corresponding to the storage request has not been stored with reference to the storage-request-data information supplied from the external device 70, the archive device 10 requests the external device 70 to transmit the data. Accordingly, a process of storing data is smoothly performed.

Second Embodiment

In a second embodiment, a data storing system including the archive device 10 and the external device 70 according to the first embodiment described above will be described.

Configuration of Data Storing System of Second Embodiment

Figure 2:
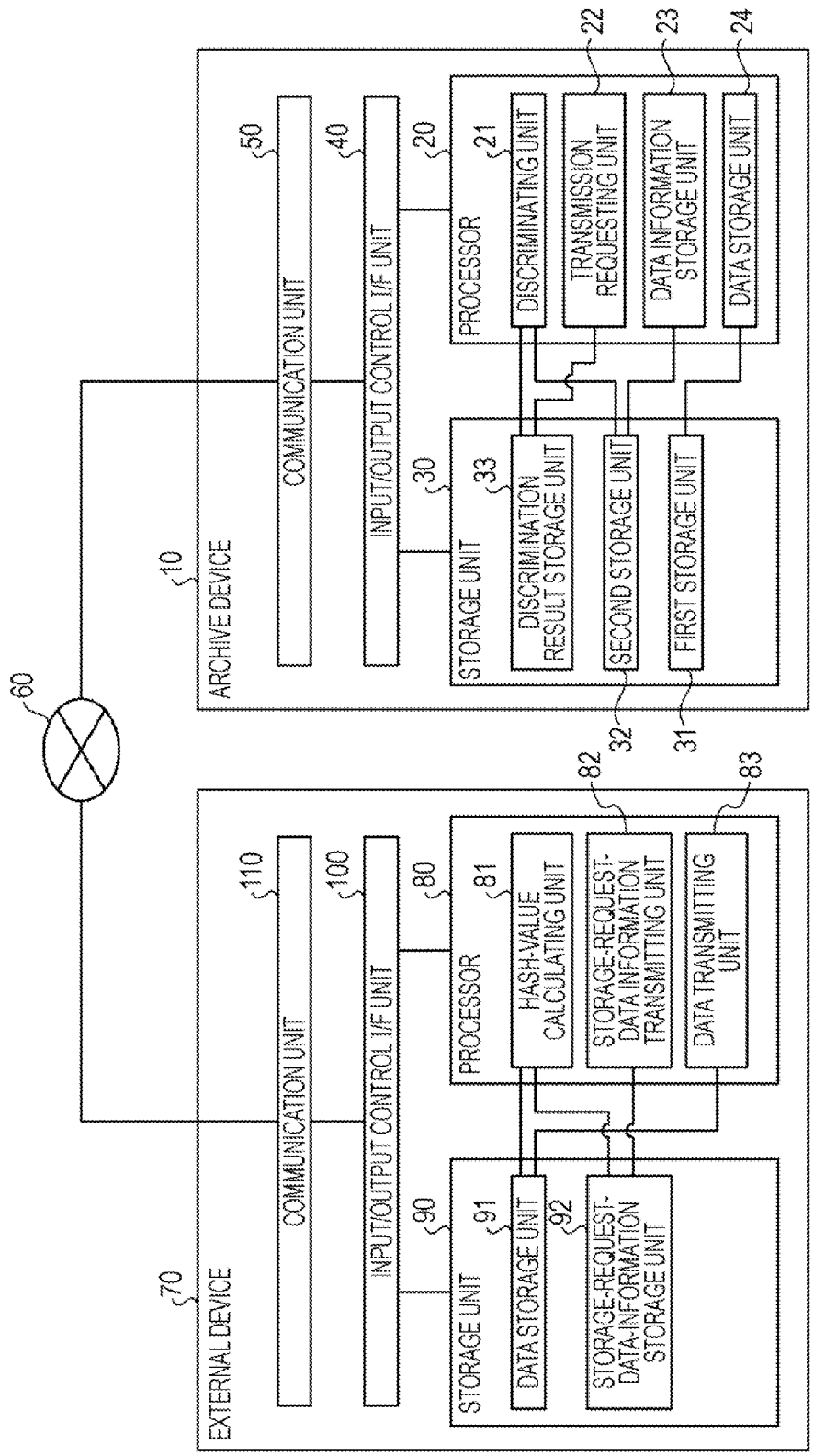
FIG. 2 is a diagram illustrating a configuration of a data storing system according to a second embodiment.
Figure 3:
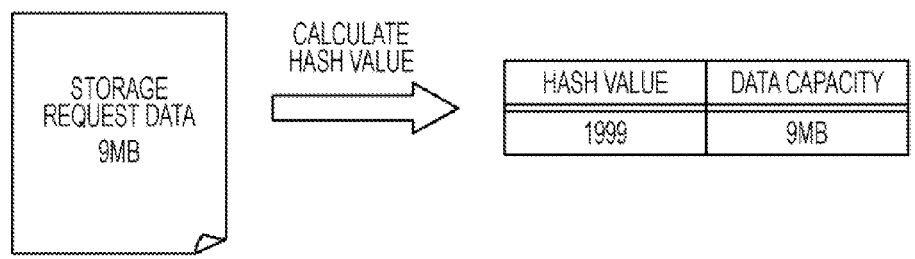
FIG. 3 is a diagram illustrating a hash value calculating unit according to the second embodiment.
Figure 4:
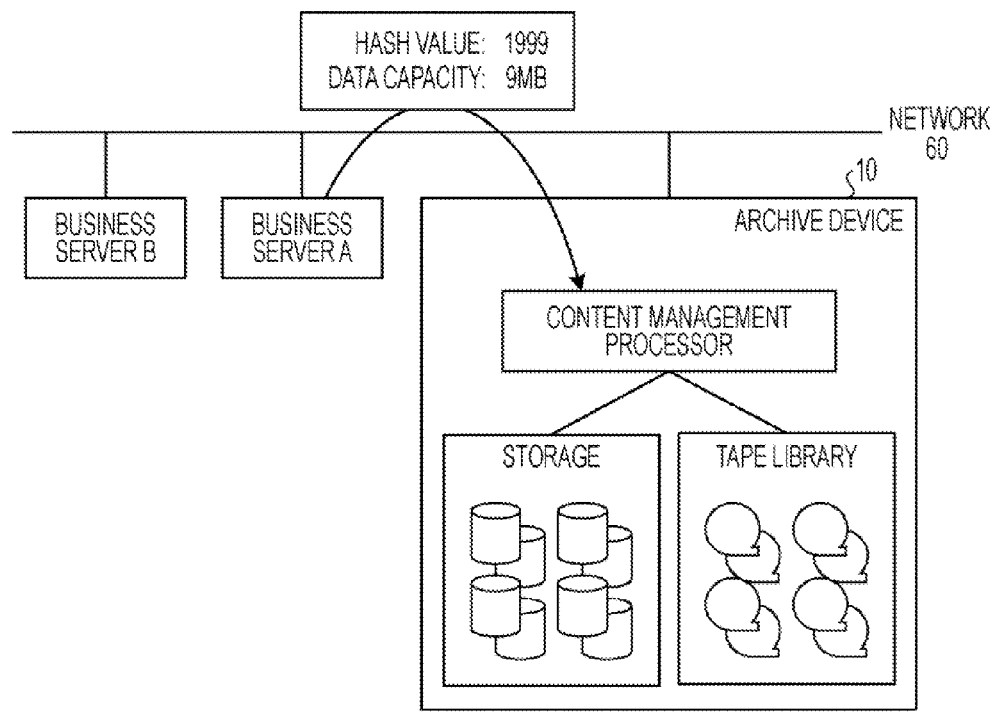
FIG. 4 is a diagram illustrating a storage-request-data-information transmitting unit according to the second embodiment.
Figures 5, 6:
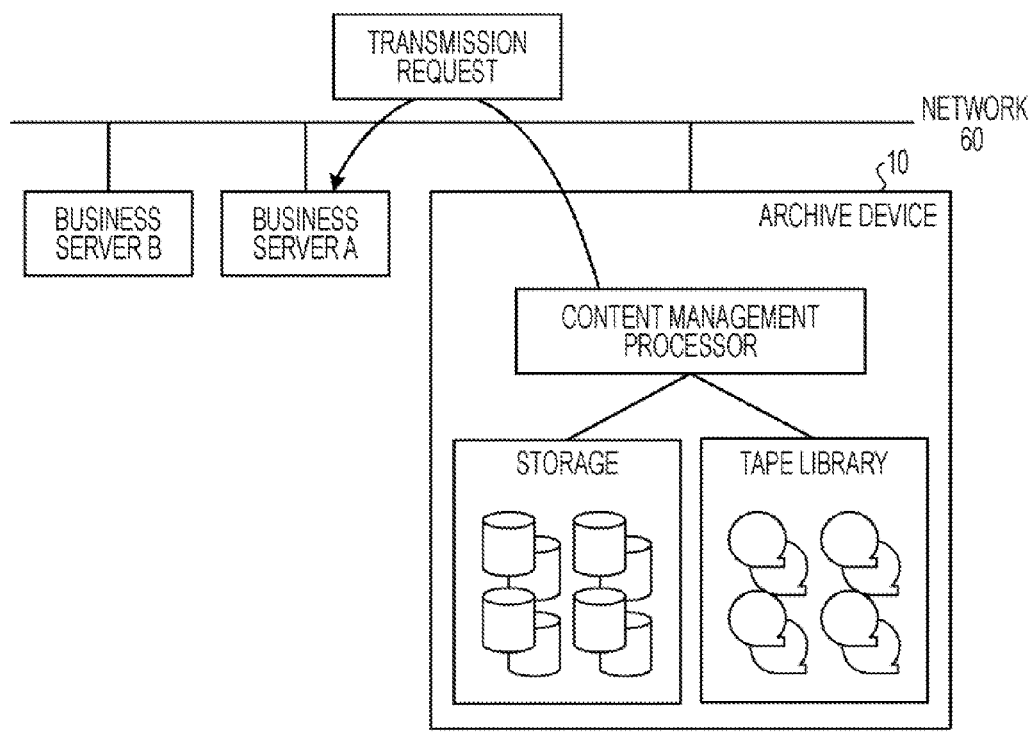
FIG. 5 is a diagram illustrating a second storage unit according to the second embodiment.
FIG. 6 is a diagram illustrating a transmission requesting unit according to the second embodiment.

First, a configuration of the data storing system according to the second embodiment will be described with reference to FIGS. 2 to 6. FIG. 2 is a diagram illustrating the configuration of the data storing system according to the second embodiment. FIG. 3 is a diagram illustrating a hash value calculating unit according to the second embodiment. FIG. 4 is a diagram illustrating a storage-request-data-information transmitting unit according to the second embodiment. Furthermore, FIG. 5 is a diagram illustrating a second storage unit according to the second embodiment. FIG. 6 is a diagram illustrating a transmission requesting unit according to the second embodiment.

As illustrated in FIG. 2, the data storing system according to the second embodiment includes the archive device 10 serving as a data storing device and the external device 70 which are connected to each other through a network 60. Note that, although only one external device 70 is illustrated in FIG. 2, a plurality of the external devices 70 are actually connected to the archive device 10 through the network 60. Furthermore, the external device 70 corresponds to a business server installed in a company or a personal-use terminal such as a PC (Personal Computer).

The network 60 relays data transmitted between the archive device 10 and the external device 70. Examples of the network 60 include a LAN (Local Area Network) and an FC (Fibre Channel).

Hereinafter, first, a configuration of the external device 70 according to the second embodiment will be described, and subsequently, a configuration of the archive device 10 according to the second embodiment will be described.

The external device 70 according to the second embodiment requests the archive device 10 to store various digital content (hereinafter referred to as "data"). The external device 70 includes, as illustrated in FIG. 2, a processor 80, a storage unit 90, an input/output control I/F unit 100, and a communication unit 110.

The input/output control I/F unit 100 relays various information transmitted and received among the communication unit 110, the processor 80, and the storage unit 90.

The communication unit 110 performs a communication with the archive device 10. Note that information transmitted and received between the communication unit 110 and the archive device 10 will be described in detail hereinafter.

The storage unit 90 stores data stored in the external device 70 and a result of a process performed by the processor 80 which will be described hereinafter. The storage unit 90 includes a data storage unit 91 and a storage-request-data-information storage unit 92.

The data storage unit 91 stores data stored in the external device 70. For example, the data storage unit 91 stores data of digital content such as music, movies, electronic mails, medical images and document data.

The storage-request-data-information storage unit 92 stores storage-request-data information including a hash value of data calculated by the processor 80, which will be described hereinafter, and a data capacity of the data serving as a calculation source of the hash value which are associated with each other. Note that the storage-request-data information will be described in detail hereinafter.

The processor 80 performs various processes when the external device 70 requests the archive device 10 to store data. The processor 80 includes a hash-value calculating unit 81, a storage-request-data information transmitting unit 82, and a data transmitting unit 83.

When an operator who operates the external device 70 inputs a request for storing data through an input unit, not illustrated, the hash-value calculating unit 81 reads data (storage request data) corresponding to the storage request from the data storage unit 91 and calculates a hash value of the read data. Then, the hash-value calculating unit 81 stores information including the calculated hash value and a data capacity of the data serving as a calculation source of the hash value which are associated with each other as storage-request-data information in the storage-request-data-information storage unit 92. For example, as illustrated in FIG. 3, the hash-value calculating unit 81 calculates a hash value of 1999 of storage request data having a data capacity of 9 MB and stores storage-request-data information representing that a hash value is 1999 and a data capacity is 9 MB to the storage-request-data-information storage unit 92.

When the storage-request-data-information storage unit 92 stores the storage-request-data information, the storage-request-data information transmitting unit 82 read the stored storage-request-data information and transmits the storage-request-data information to the archive device 10 through the communication unit 110. For example, the storage-request-data information transmitting unit 82 transmits the storage-request-data information representing that a hash value is 1999 and a data capacity is 9 MB from the external device 70 serving as a business server A including the storage-request-data information transmitting unit 82 to the archive device 10 as illustrated in FIG. 4.

Note that a content management processor illustrated in FIG. 4 performs data (digital content) management of the archive device 10, and corresponds to a processor 20, the second storage unit 32, and a discrimination-result storage unit 33 included in the archive device 10, which will be described hereinafter (refer to FIG. 2). Furthermore, storage and a tape library illustrated in FIG. 4 correspond to the first storage unit 31 included in the archive device 10, which will be described hereinafter (refer to FIG. 2).

When the communication unit 110 received a request for transmitting storage request data supplied from the archive device 10, the data transmitting unit 83 reads the storage request data from the data storage unit 91 and transmits the read storage request data to the archive device 10 through the communication unit 110. For example, when receiving a request for transmitting data corresponding to the storage-request-data information representing that a hash value is 1999 and a data capacity is 9 MB, the data transmitting unit 83 reads the data corresponding to the storage-request-data information from the data storage unit 91 and transmits the data to the archive device 10.

Next, the configuration of the archive device 10 according to the second embodiment will be described. The archive device 10 according to the second embodiment stores data supplied from the external device 70 connected to the archive device 10 through the network 60. The archive device 10 includes the processor 20, a storage unit 30, an input/output control I/F unit 40, and a communication unit 50.

The input/output control I/F unit 40 relays various information transmitted and received among the communication unit 50, the processor 20, and the storage unit 30.

The communication unit 50 performs a communication with the external device 70. Note that information transmitted and received between the communication unit 50 and the external device 70 will be described in detail hereinafter.

The storage unit 30 stores data which is determined to be stored in the archive device 10 by the processor 20, which will be described hereinafter, and a result of a process performed by the processor 20, which will be described hereinafter. The storage unit 30 includes the first storage unit 31, the second storage unit 32, and the discrimination-result storage unit 33.

The first storage unit 31 stores data supplied from the external device 70. Specifically, the first storage unit 31 stores data (storage request data) transmitted from the external device 70 in accordance with a transmission request supplied from the archive device 10. Note that the first storage unit 31 includes the storage and the tape library as illustrated in FIG. 4. For example, the storage is used as a main storage medium for storing the storage request data, and the tape library is used as a storage medium for backup of the data stored in the storage.

The second storage unit 32 stores, when data is to be stored in the first storage unit 31, various information on the data to be stored. Specifically, the second storage unit 32 stores data information including a hash value and a data capacity of data to be archived in the first storage unit 31. Furthermore, the second storage unit 32 stores an archive ID used to uniquely identify the data to be archived in the first storage unit 31 which has been associated with the data information and a storage path used to uniquely specify a storage place in the first storage unit 31. Hereinafter, information obtained by associating the data information, the archive ID, and the storage path with one another is referred to as "attribute information".

For example, the second storage unit 32 stores an archive ID "001", a hash value "1456", a data capacity "100 MB", and a storage path "/data/1", for example, as illustrated in FIG. 5. Furthermore, the second storage unit 32 stores an archive ID "002", a hash value "2789", a data capacity "20 MB", and a storage path "/data/2", for example, as illustrated in FIG. 5.

Note that the discrimination-result storage unit 33 stores a result of a determination performed by the discriminating unit 21, and the result of the determination will be described in detail hereinafter.

The processor 20 executes various processes in accordance with a data storage request supplied from the external device 70. The processor 20 includes the discriminating unit 21, the transmission requesting unit 22, a data information storage unit 23, and a data storage unit 24.

The discriminating unit 21 compares the storage-request-data information supplied from the external device 70 with the data information of the attribute information stored in the second storage unit 32 so as to determine whether data information the same as the storage-request-data information has been stored in the second storage unit 32. Specifically, the discriminating unit 21 determines whether the second storage unit 32 has stored attribute information including data information having a data capacity the same as that of the storage request data, and stores a result of the determination in the discrimination-result storage unit 33.

For example, when receiving storage-request-data information including a hash value of 1999 and a data capacity of 9 MB supplied from the external device 70, the discriminating unit 21 refers to all the attribute information illustrated in FIG. 5 so as to determine whether data information having a hash value of 1999 and a data capacity of 9 MB is included in the attribute information. When the determination is negative, the discriminating unit 21 stores a result of the determination "no same data" in the discrimination-result storage unit 33. On the other hand, when the determination is affirmative, the discriminating unit 21 stores a result of the determination "same data included" in the discrimination-result storage unit 33.

Only when the determination result "no same data" is stored in the discrimination-result storage unit 33, the transmission requesting unit 22 requests the external device 70 to transmit the storage request data. For example, the transmission requesting unit 22 requests a business server A serving as the external device 70 to transmit the storage request data as illustrated in FIG. 6.

After the discriminating unit 21 determines that the same data has not been stored, the data information storage unit 23 generates attribute information of the storage request data transmitted from the external device 70 in accordance with the transmission request supplied from the transmission requesting unit 22 and stores the generated attribute information in the second storage unit 32. Specifically, the data information storage unit 23 assigns an archive ID to the storage request data, generates attribute information by associating the archive ID with storage-request-data information (a hash value and a data capacity) and a storage path, and stores the generated attribute information in the second storage unit 32. Then, the data information storage unit 23 transmits the archive ID to the external device 70 serving as a transmission source of the storage request data.

On the other hand, when the discriminating unit 21 determines that the same storage request data has been stored, the data information storage unit 23 transmits an archive ID of the stored data the same as the storage request data to the external device 70 serving as a storage request source.

Note that the external device 70 stores the received archive ID in a storage unit, not illustrated. Then, the external device 70 deletes data corresponding to the stored archive ID from the data storage unit 91 where appropriate.

After the discriminating unit 21 determines that the same data has not been stored, the data storage unit 24 stores the storage request data supplied from the external device 70 in accordance with the transmission request supplied from the transmission requesting unit 22 in the first storage unit 31.

Procedures of Processes in Data Storing System in Second Embodiment

Figure 7:
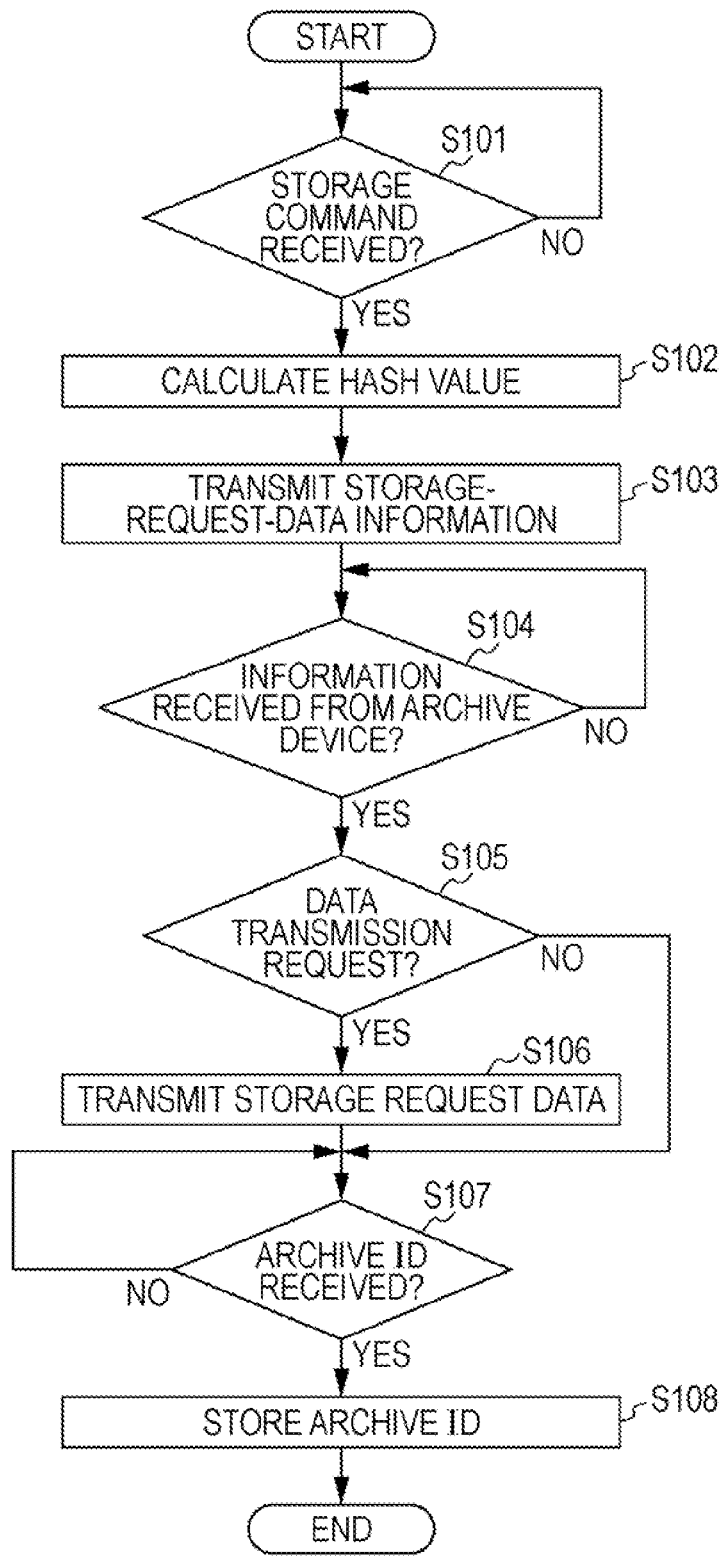
FIG. 7 is a diagram illustrating a procedure of a process performed by an external device according to the second embodiment.
Figure 8:
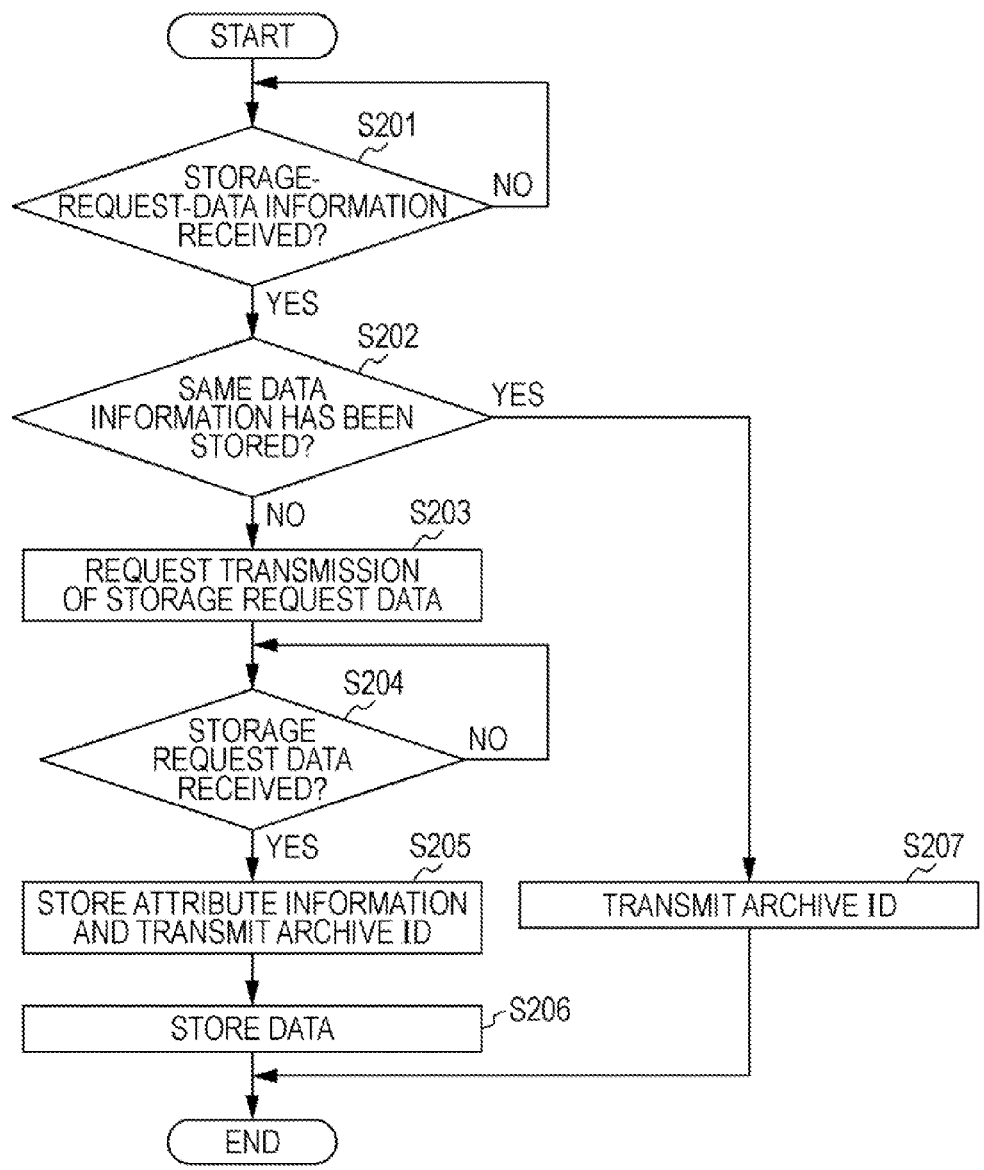
FIG. 8 is a diagram illustrating a procedure of a process performed by an archive device according to the second embodiment.

Next, processes performed in data storing system according to the second embodiment will be described with reference to FIGS. 7 and 8. FIG. 7 is a diagram illustrating a procedure of a process performed by the external device 70 according to the second embodiment. FIG. 8 is a diagram illustrating a procedure of a process performed by the archive device 10 according to the second embodiment.

Procedure of Process Performed by External Device in Second Embodiment

As illustrated in FIG. 7, first, when the external device 70 according to the second embodiment received a storage command (when a determination is affirmative in step S101), the hash-value calculating unit 81 calculates a hash value of storage request data to be stored in step S102. Specifically, when an operator who operates the external device 70 inputs a data storage request through an input unit, not illustrated, the hash-value calculating unit 81 reads storage request data from the data storage unit 91 and calculates a hash value of the read data.

Then, the storage-request-data information transmitting unit 82 transmits storage-request-data information including the hash value and a data capacity of the storage request data to the archive device 10 in step S103.

Next, when receiving information from the archive device 10 (when a determination is affirmative in step S104), the external device 70 of the second embodiment determines whether the received information is a data transmission request in step S105.

When the determination is affirmative in step S105, the data transmitting unit 83 transmits the storage request data to the archive device 10 in step S106. Then, the external device 70 determines whether an archive ID has been transmitted from the archive device 10 in step S107.

On the other hand, when the determination is negative in step S105, the external device 70 proceeds to step S107 so as to determine whether an archive ID has been transmitted from the archive device 10.

When the determination is affirmative in step S107, the external device 70 stores the received archive ID in step S108, and the process is terminated.

Procedure of Process Performed by Archive Device in Second Embodiment

As illustrated in FIG. 8, first, when the archive device 10 received storage-request-data information supplied from the external device 70 (when a determination is affirmative in step S201), the discriminating unit 21 determines whether the same data information has been stored in the second storage unit 32 in step S202. Specifically, the discriminating unit 21 determines whether attribute information including data information having a hash value the same as a hash value of storage request data and having a data capacity the same as a data capacity of the storage request data has been stored in the second storage unit 32.

When the determination is negative in step S202, the transmission requesting unit 22 requests the external device 70 which transmitted the storage-request-data information to transmit the storage request data in step S203.

When the archive device 10 received the storage request data supplied from the external device 70 (when a determination is affirmative in step S204), the data information storage unit 23 generates attribute information of the storage request data, stores the generated attribute information in the second storage unit 32, and transmits an archive ID to the external device 70 in step S205.

Thereafter, the data storage unit 24 stores the storage request data supplied from the external device 70 in the first storage unit 31 in step S206, and the process is terminated.

On the other hand, when the determination is affirmative in step S202, the data information storage unit 23 transmits an archive ID to the external device 70 in step S207, and the process is terminated. Specifically, the data information storage unit 23 transmits an archive ID of data which has been stored and which is the same as the storage request data to the external device 70, and the process is terminated.

Effect of Second Embodiment

As described above, in the archive device 10 of the second embodiment, when data is to be stored in the first storage unit 31 in accordance with a request from the external device 70, the data information storage unit 23 stores data information including a hash value and a data capacity of the data which are associated with each other in the second storage unit 32. The discriminating unit 21 receives storage-request-data information including a hash value and a data capacity of the data supplied from the external device 70 serving as a data storage request source, and determines whether data information the same as the received storage-request-data information has been stored in the second storage unit 32. Only when the discriminating unit 21 determines that the same data information has not been stored, the transmission requesting unit 22 requests the external device 70 which transmitted the storage-request-data information to transmit data which is to be stored in the first storage unit 31 and which corresponds to the storage-request-data information. Furthermore, in the external device 70, the hash-value calculating unit 81 calculates a hash value of storage request data, and the storage-request-data information transmitting unit 82 transmits the storage-request-data information to the archive device 10. Then, only when receiving the transmission request supplied from the archive device 10 which transmitted the storage-request-data information, the data transmitting unit 83 transmits storage request data corresponding to the storage-request-data information to the archive device 10 which transmitted a transmission request. Accordingly, load applied to the network 60 caused by a transmission of data which has been stored in the archive device 10 and load applied to the CPU of the archive device 10 caused by a calculation of a hash value are prevented from being increased, and a process of storing data can be smoothly performed.

Third Embodiment

In the first and second embodiments described above, a case where a determination as to whether storage request data is newly stored in the archive device 10 is made in accordance with a hash value calculated using the entire storage request data is described. In a third embodiment, a case where a determination as to whether storage request data is newly stored in the archive device 10 is made in accordance with hash values calculated using division data items obtained by dividing the storage request data will be described.

Configuration of Data Storing System in Third Embodiment

Figures 9, 10:
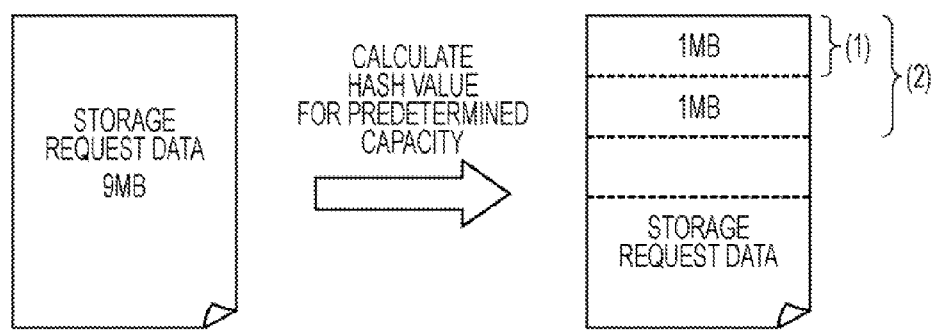
FIG. 9 is a diagram illustrating a hash value calculating unit according to a third embodiment.
FIG. 10 is a diagram illustrating a second storage unit according to the third embodiment.
Figure 11:
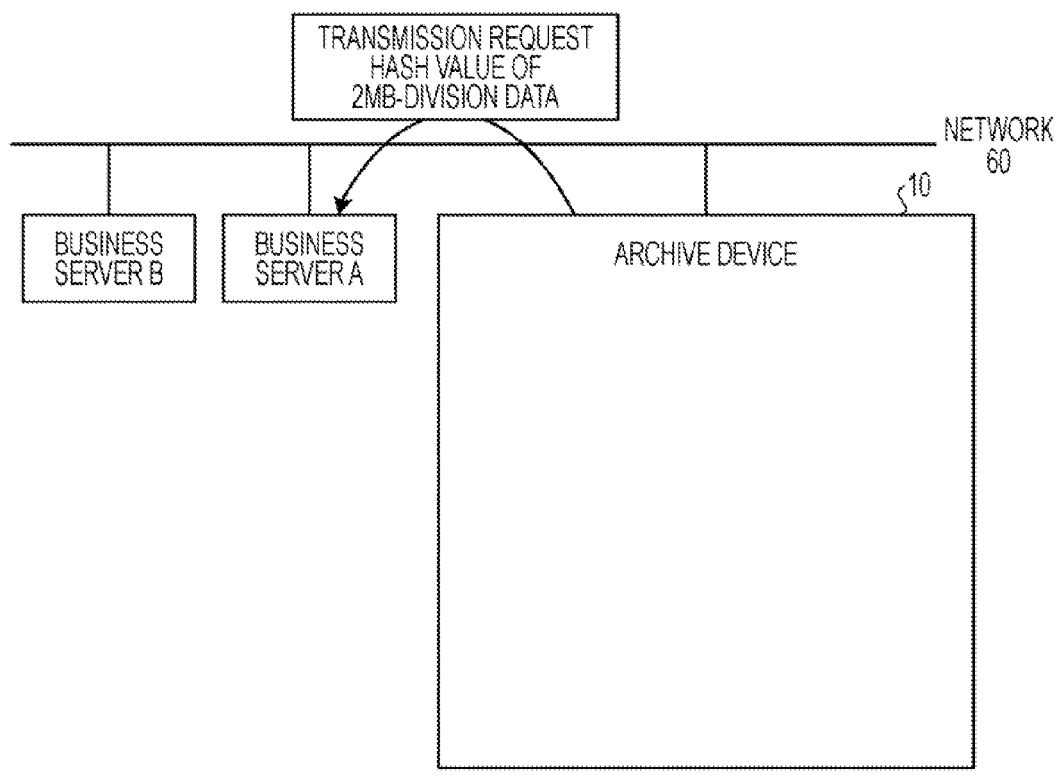
FIG. 11 is a diagram illustrating a transmission requesting unit according to the third embodiment.

First, a configuration of a data storing system according to the third embodiment will be described with reference to FIG. 2 and FIGS. 9 to 11. FIG. 2 is the diagram illustrating the configuration of the data storing system according to the second embodiment. FIG. 9 is a diagram illustrating a hash value calculating unit 81 according to the third embodiment. FIG. 10 is a diagram illustrating a second storage unit 32 according to the third embodiment. FIG. 11 is a diagram illustrating a transmission requesting unit 22 according to the third embodiment.

The data storing system according to the third embodiment is illustrated as a function block diagram the same as that of the data storing system according to the second embodiment illustrated in FIG. 2. However, a process performed by the hash-value calculating unit 81 is different from that performed by the hash-value calculating unit 81 of the second embodiment. Furthermore, data stored in the second storage unit 32 and processes performed by a discriminating unit 21 and the transmission requesting unit 22 in the data storing system according to the third embodiment are different from those of the second embodiment, and therefore, descriptions thereof are mainly described hereinafter.

First, part of a process performed by an external device 70 of the third embodiment which is different from the second embodiment will be described hereinafter. The hash-value calculating unit 81 according to the third embodiment successively calculates hash values of division data items obtained by dividing storage request data which is used for a storage request in a unit of a predetermined capacity and successively stores the calculated hash values in a storage-request-data-information storage unit 92.

For example, the hash-value calculating unit 81 calculates a hash value of one of division data items obtained by dividing storage request data of 9 MB in a unit of 1 MB which corresponds to first 1 MB as denoted by (1) of FIG. 9 in accordance with an instruction issued by the archive device 10 and stores the hash value in the storage-request-data-information storage unit 92. Then, when receiving an instruction for calculating a hash value from the archive device 10 again, the hash-value calculating unit 81 of the third embodiment calculates a hash value of division data items corresponding to 2 MB obtained by adding another division data item of 1 MB to the first division data item of 1 MB as denoted by (2) of FIG. 9, and stores the hash value in the storage-request-data-information storage unit 92.

That is, every time the hash-value calculating unit 81 of the third embodiment receives a hash-value calculating request from the archive device 10, the hash-value calculating unit 81 calculates hash values of division data items (1 MB to 9 MB) obtained by incrementing a data capacity by 1 MB. Then, the hash-value calculating unit 81 of the third embodiment stores information items including the calculated hash values and data capacities of the division data items serving as calculation sources which are associated with each other as storage-request-data information items in the storage-request-data-information storage unit 92.

Every time a storage-request-data information item of a division data item is stored in the storage-request-data-information storage unit 92, a storage-request-data information transmitting unit 82 reads the storage-request-data information item from the storage-request-data-information storage unit 92 and transmits the read storage-request-data information to the archive device 10.

Next, part of a process performed by the archive device 10 of the third embodiment different from that of the second embodiment will be described below. The second storage unit 32 of the third embodiment is different from that of the second embodiment in that the second storage unit 32 of the third embodiment stores a plurality of hash values for identical attribute information. That is, the second storage unit 32 of the third embodiment stores hash values calculated from division data items obtained by dividing data stored in the first storage unit 31 in a unit of a predetermined capacity as described above in addition to a hash value calculated from the entire data stored in the first storage unit 31.

Specifically, when a unit of a predetermined capacity corresponds to 1 MB and data of 5 MB is stored in the first storage unit 31, the second storage unit 32 stores a hash value of a division data item corresponding to 1 MB, a division data item corresponding to 2 MB, a division data item corresponding to 3 MB, and a division data item corresponding to 4 MB in addition to a hash value corresponding to the entire data of 5 MB.

For example, as illustrated in FIG. 10, the second storage unit 32 stores an archive ID "001", hash values, a storage path "/data/1", a data capacity "100 MB" and the like as attribute information. Here, as illustrated in FIG. 10, the second storage unit 32 stores a hash value of 1111 for 1 MB, a hash value of 1222 for 2 MB, ... a hash value of 1136 for n MB, ... and a hash value of 1456 for the entire data which correspond to the archive ID "001". Furthermore, as illustrated in FIG. 10, the second storage unit 32 stores an archive ID "002", hash values, a storage path "/data/2", a data capacity "20 MB" and the like as attribute information. Here, as illustrated in FIG. 10, the second storage unit 32 stores a hash value of 2222 for 1 MB, a hash value of 2333 for 2 MB, ... a hash value of 2269 for n MB, ... and a hash value of 2789 for the entire data which correspond to the archive ID "002".

The discriminating unit 21 of the third embodiment successively receives the hash values of the division data items from the external device 70 as storage-request-data information items and successively determines whether a hash value the same as each of the received hash values has been stored in the second storage unit 32. Specifically, every time the discriminating unit 21 receives a hash value of a division data item, the discriminating unit 21 determines whether a hash value the same as the received hash value of the division data item for the a certain capacity has been stored in the second storage unit 32, and stores a result of the determination in the discrimination-result storage unit 33.

For example, when receiving a hash value of a division data item of 1 MB, the discriminating unit 21 refers to all hash values corresponding to 1 MB included in the attribute information illustrated in FIG. 10 and determines whether the same hash value has been stored. When the determination is negative, the discriminating unit 21 stores a determination result "1 MB: hash value, no same data" in the discrimination-result storage unit 33. On the other hand, when the determination is affirmative, the discriminating unit 21 stores a determination result "1 MB: hash value, same data stored" in the discrimination-result storage unit 33.

Only when the determination result representing that the same hash value has not been stored is stored, the transmission requesting unit 22 of the third embodiment requests the external device 70 to transmit entire storage request data including the division data item corresponding to the hash value used for the determination. For example, in a determination using a hash value of division data item of 1 MB illustrated in FIG. 9, when it is determined that the same hash value has not been stored, the transmission requesting unit 22 requests the external device 70 to transmit the entire storage request data corresponding to 9 MB.

Furthermore, when the determination result representing that the same hash value has been stored is stored in the discrimination-result storage unit 33, the transmission requesting unit 22 of the third embodiment requests the external device 70 to transmit a hash value of a next division data item of the storage request data. Specifically, the discrimination-result storage unit 33 of the third embodiment requests the external device 70 to transmit a hash value of a next division data item including the division data item corresponding to the hash value the same as the stored hash value.

For example, as illustrated in FIG. 11, the transmission requesting unit 22 of the third embodiment requests the business server A serving as the external device 70 to transmit a hash value corresponding to the division data of 2 MB obtained by adding "division data item of 1 MB which has been subjected to the determination" to "new division data of 1 MB" as illustrated in FIG. 11.

When determination results "the same data stored" are stored for the hash values of all division data items, the transmission requesting unit 22 requests the external device 70 to transmit a hash value of the entire storage request data and a data capacity of the storage request data.

Then, when a determination result "the hash value of entire data and the same data is included" is stored, the transmission requesting unit 22 notifies the external device 70 of the fact that data the same as the storage request data has been already stored.

Procedure of Processes in Data Storing System in Third Embodiment

Figure 12:
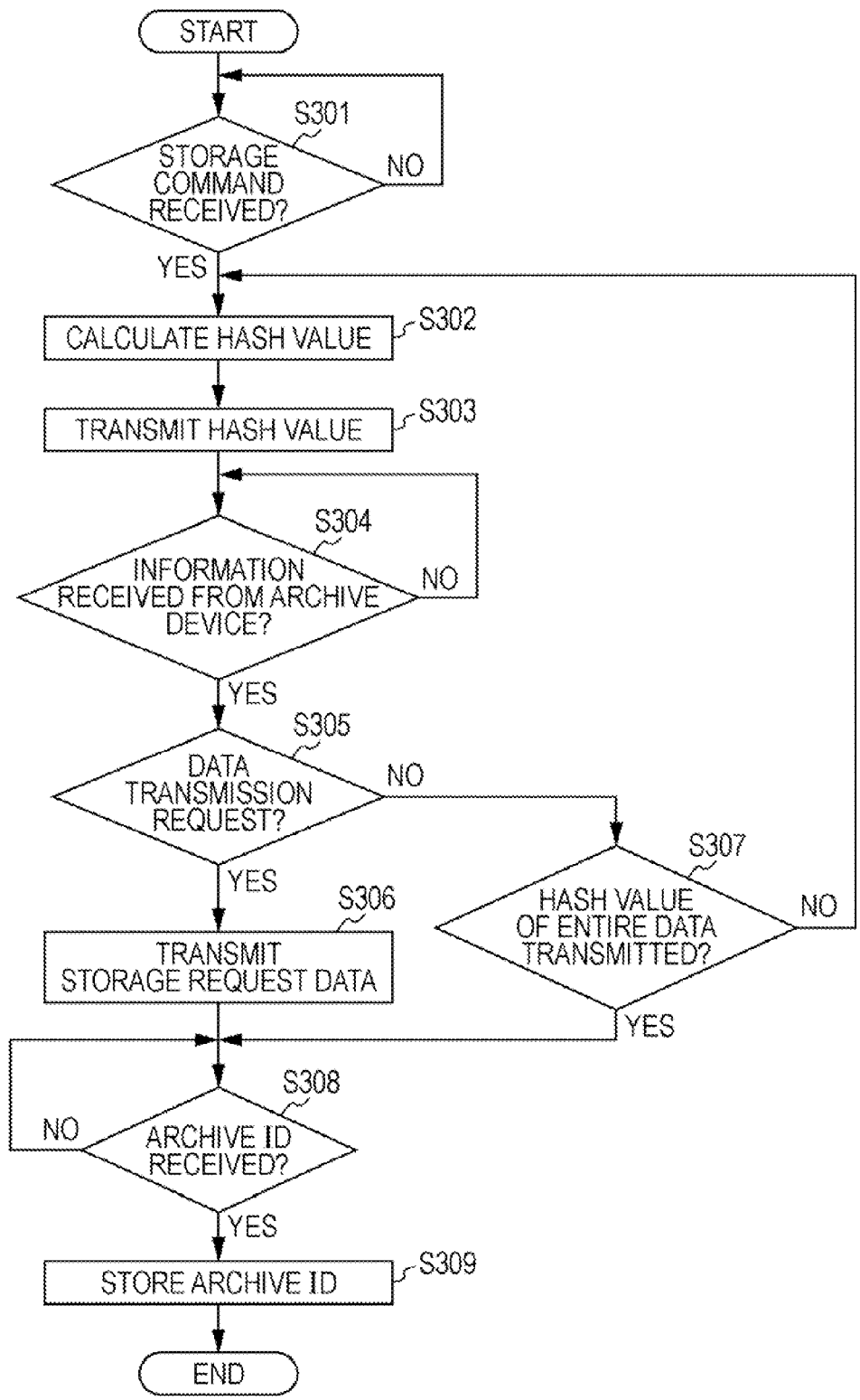
FIG. 12 is a diagram illustrating a procedure of a process performed by an external device according to the third embodiment.
Figure 13:
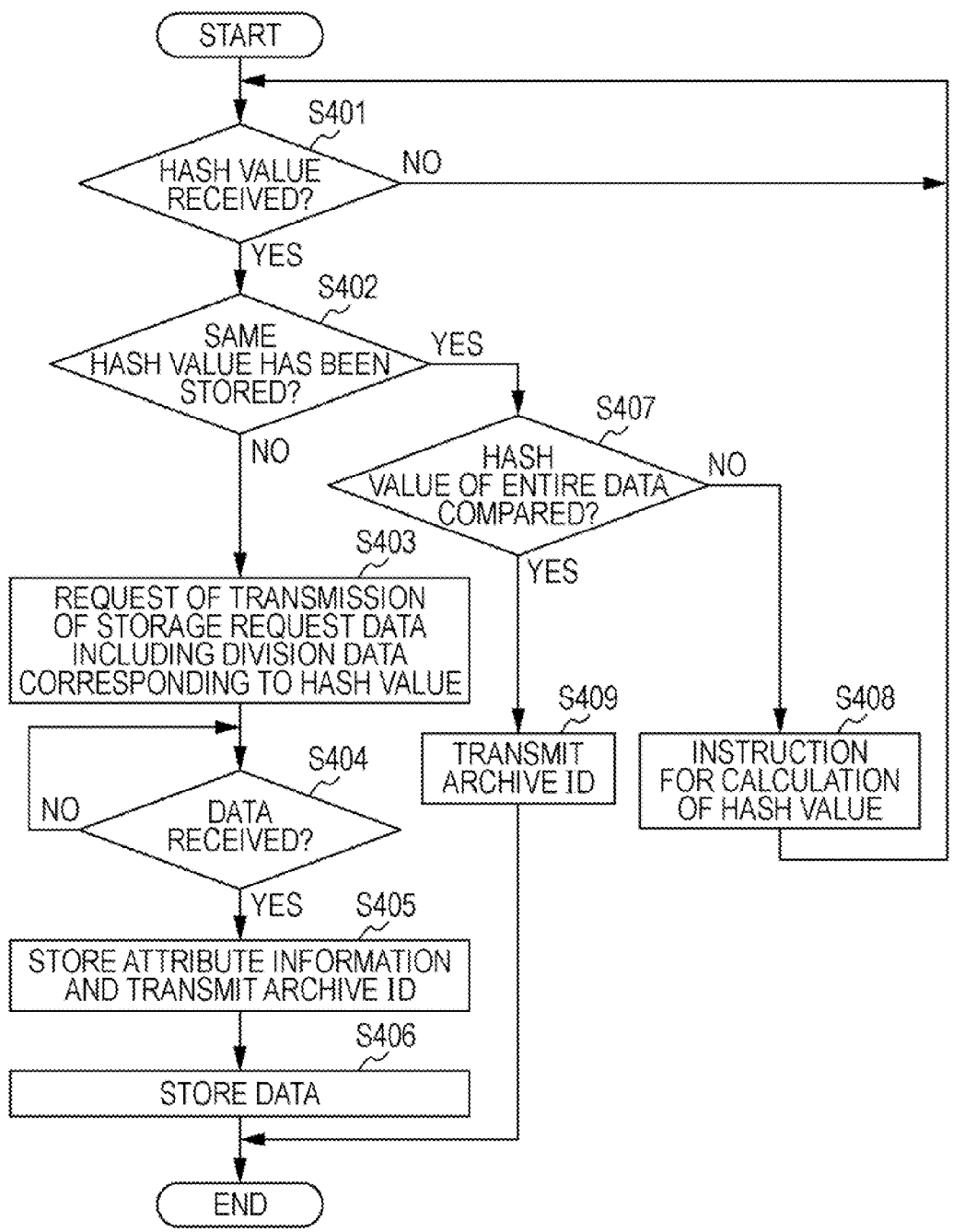
FIG. 13 is a diagram illustrating a procedure of a process performed by the archive device according to the third embodiment.

Referring now to FIGS. 12 and 13, a procedure of a process performed in the data storing system according to the third embodiment will be described. FIG. 12 is a diagram illustrating a procedure of a process performed by the external device 70 according to the third embodiment. FIG. 13 is a diagram illustrating a procedure of a process performed by the archive device 10 according to the third embodiment.

As illustrated in FIG. 12, first, when the external device 70 of the third embodiment received a storage command (when a determination is affirmative in step S301), a hash-value calculating unit 81 calculates a hash value of one of division data items obtained by dividing storage request data in step S302.

Then, a storage-request-data information transmitting unit 82 transmits the hash value of the division data item to the archive device 10 in step S303.

Subsequently, when receiving information supplied from the archive device 10 (when a determination is affirmative in step S304), the external device 70 of the third embodiment determines whether the information corresponds to a request for transmitting data in step S305.

When the determination is affirmative in step S305, a data transmitting unit 83 transmits the storage request data including the division data item corresponding to the hash value transmitted by the storage-request-data information transmitting unit 82 to the archive device 10 in step S306. Then, the external device 70 determines whether an archive ID has been received from the archive device 10 in step S308.

On the other hand, when the received information does not correspond to the request for transmitting data but a request for retransmitting a hash value of one of the division data items, i.e., when the determination is negative in step S305, the external device 70 determines whether a hash value of the entire storage request data has been transmitted in step S307.

When the determination is negative in step S307, the hash-value calculating unit 81 returns to step S302 and calculates a hash value again. Specifically, the hash-value calculating unit 81 calculates a hash value of a next division data item including the division data corresponding to the preceding hash value which has been calculated.

On the other hand, when the determination is affirmative in step S307, the external device 70 proceeds to step S308 where it is determined whether an archive ID has been received.

When the determination is affirmative in step S308, the external device 70 stores the received archive ID in step S309, and the process is terminated.

Procedure of Process Performed by Archive Device in Third Embodiment

As illustrated in FIG. 13, first, when the archive device 10 according to the third embodiment received a hash value supplied from the external device 70 (when a determination is affirmative in step S401), the discriminating unit 21 determines whether the same hash value has been stored in the second storage unit 32 in step S402. Specifically, the discriminating unit 21 determines whether a hash value the same as the hash value received from the storage-request-data information transmitting unit 82 has been stored in the second storage unit 32 in terms of a data capacity of a division data item.

When the determination is negative in step S402, the transmission requesting unit 22 requests the external device 70 to transmit the storage request data including a division data item corresponding to the hash value in step S403.

When the storage request data supplied from the external device 70 is received (when a determination is affirmative in step S404), a data information storage unit 23 generates attribute information of the storage request data, stores the generated attribute information in a second storage unit 32, and transmits an archive ID to the external device 70 in step S405.

Thereafter, the data storage unit 24 stores the storage request data supplied from the external device 70 in the first storage unit 31 in step S406, and the process is terminated.

On the other hand, when the determination is affirmative in step S402, the transmission requesting unit 22 determines whether a hash value of the entire data have been subjected to comparison in step S407. Specifically, the transmission requesting unit 22 determines whether a determination for a hash value corresponding to a data capacity of the entire storage request data has been made.

When the determination is negative in step S407, the transmission requesting unit 22 instructs the external device 70 to calculate a hash value in step S408.

On the other hand, when the determination is affirmative in step S407, the data information storage unit 23 transmits an archive ID to the external device 70 in step S409, and the process is terminated. Specifically, the data information storage unit 23 transmits an archive ID corresponding to the data which has been stored and which are the same as the storage request data to the external device 70, and the process is terminated.

Effect of Third Embodiment

As described above, in the archive device 10 according to the third embodiment, the second storage unit 32 stores hash values corresponding to division data items obtained by dividing data stored in the first storage unit 31 in a unit of a predetermined capacity. Then, the discriminating unit 21 successively receives hash values of division data items of the storage request data from the external device 70 which performs data storage requests, and determines whether a hash value the same as each of the hash values successively received has been stored in the second storage unit 32. Only when the discriminating unit 21 determines that the same hash value has not been stored, the transmission requesting unit 22 requests the external device 70 to transmit the storage request data including the division data item corresponding to the hash value to be stored in the first storage unit 31. Furthermore, in the external device 70, the hash-value calculating unit 81 calculates hash values of division data items, and the storage-request-data information transmitting unit 82 successively transmits the hash values of the division data items of the storage request data to the archive device 10. Only when receiving a transmission request from the archive device 10 which successively received the hash values of the division data items, the data transmitting unit 83 transmits the entire storage request data including the division data corresponding to the hash value to the archive device 10 which received the transmission request. Accordingly, in the data storing system according to the third embodiment, a process of determining whether the same data has been stored can be smoothly performed by reducing load applied to a CPU of the external device 70 which calculates a hash value. Consequently, a process of storing data can be more smoothly performed.

Fourth Embodiment

In the first to third embodiments described above, a case where hash values are calculated using the external device 70 is described. However, in a fourth embodiment, hash values are calculated using an archive device 10 and an external device 70 in a switching manner.

Configuration of Data Storing System in Fourth Embodiment

Figure 14:
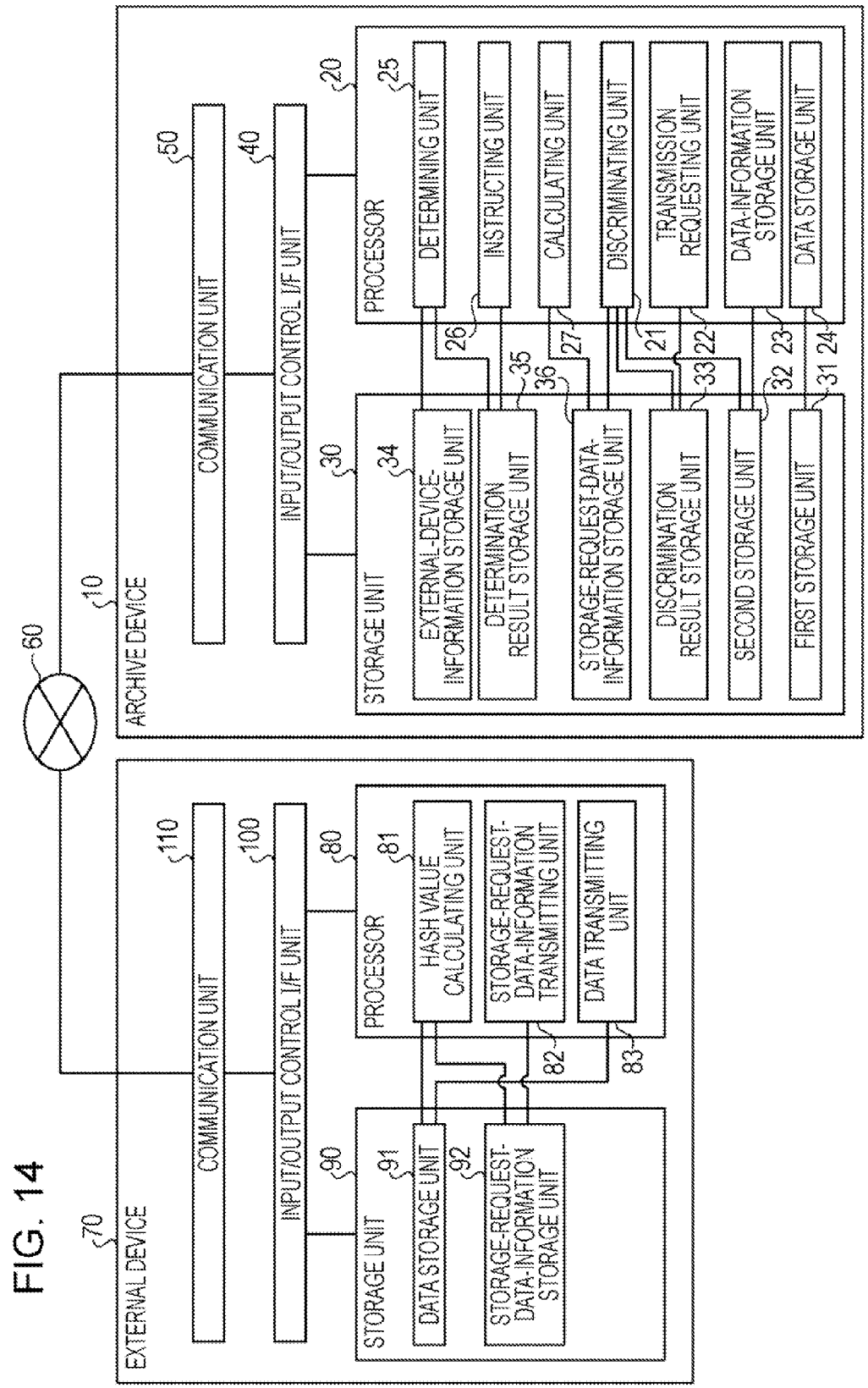
FIG. 14 is a diagram illustrating a configuration of a data storing system according to a fourth embodiment.
Figure 16A:
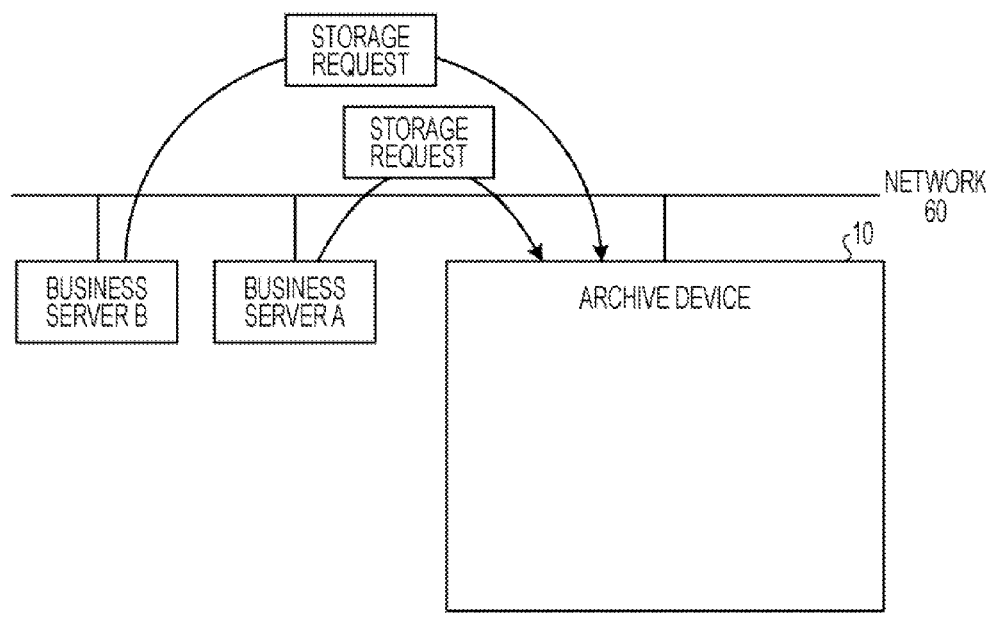
FIGS. 16A and 16B are diagrams illustrating a determining unit and an instructing unit.
Figure 16B:
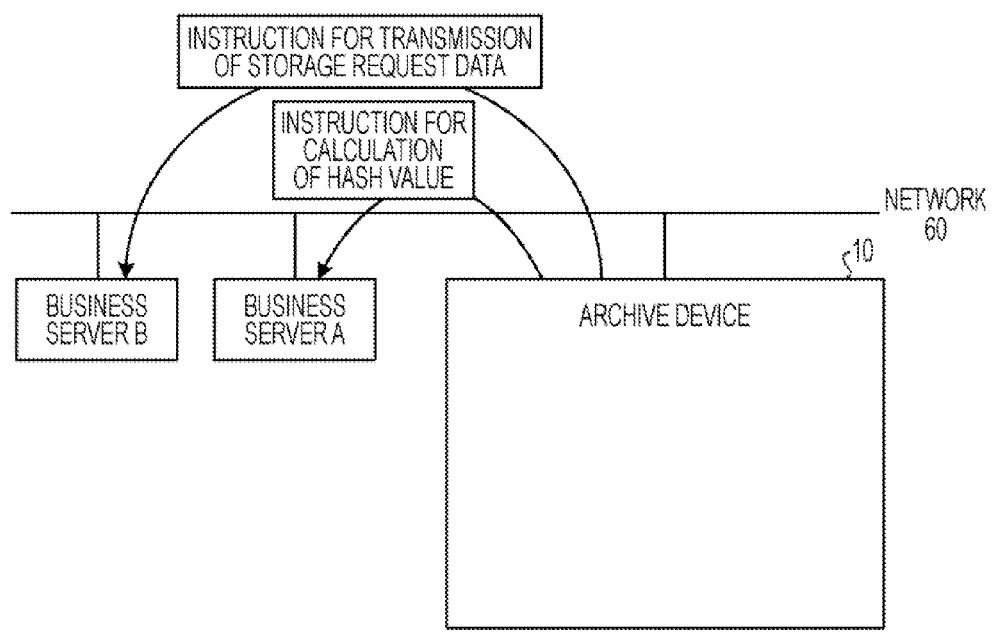
Figure 17:
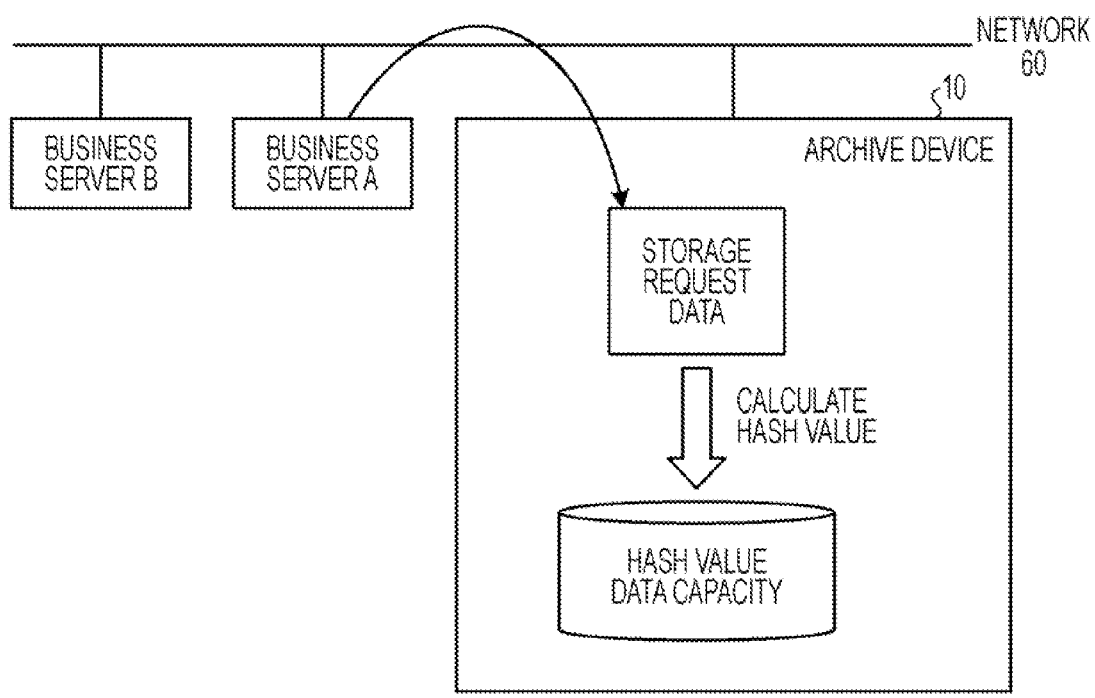
FIG. 17 is a diagram illustrating a calculating unit.

First, a configuration of a data storing system according to the fourth embodiment will be described with reference to FIGS. 14 to 17. FIG. 14 is a diagram illustrating a configuration of the data storing system according to the fourth embodiment. FIG. 15 is a diagram illustrating an external-device-information storage unit. FIGS. 16A and 16B are diagrams illustrating a determining unit and an instructing unit. FIG. 17 is a diagram illustrating a calculating unit.

The data storing system according to the fourth embodiment is different from the data storing systems according to the second and third embodiments in that the archive device 10 additionally includes a determining unit 25, an instructing unit 26, and a calculating unit 27 as illustrated in FIG. 14. Furthermore, the data storing system according to the fourth embodiment is different from the data storing systems according to the second and third embodiments in that the archive device 10 additionally includes an external-device-information storage unit 34, a determination-result storage unit 35, and a storage-request-data-information storage unit 36 as illustrated in FIG. 14. Furthermore, a process performed by a discriminating unit 21 in the data storing system according to the fourth embodiment is different from the processes performed by the discriminating units 21 in the data storing systems according to the second and third embodiments. Hereinafter, these differences are mainly described.

The external-device-information storage unit 34 stores external-device information associated with a ratio of storage of the same data (hereinafter referred to as a "single instantiation ratio") for each external device 70 makes the archive device 10 to store data. That is, the external-device-information storage unit 34 stores external-device information associated with a single instantiation ratio for each external device 70. For example, the external-device-information storage unit 34 stores external-device information representing that a business server A serving as an external device has a single instantiation ratio of 90% and external-device information representing that a business server B serving as an external device has a single instantiation ratio of 30%, as illustrated in FIG. 15.

The determination-result storage unit 35 stores a result of a determination made by the determining unit 25 described below. Note that the determination result will be described in detail hereinafter.

The storage-request-data-information storage unit 36 stores storage-request-data information calculated by the calculating unit 27 described below. Note that the storage-request-data information calculated by the calculating unit 27 will be described hereinafter.

The determining unit 25 determines, when receiving a data storage request from the external device 70, whether a process of calculating a hash value of data is to be performed using the external device 70 or the archive device 10, and stores a determination result in the determination-result storage unit 35.

Specifically, the determining unit 25 determines whether the hash-value calculating process is to be performed using the external device 70 or the archive device 10 in accordance with the external-device information stored in the external-device-information storage unit 34 and CPU utilization of the archive device 10.

For example, it is assumed that the archive device 10 received a data storage request from the business server A serving as the external device 70 as illustrated in FIG. 16A. In this case, the determining unit 25 refers to the external-device information representing that the business server A serving as the external device has the single instantiation ratio of 90%, and determines whether the single instantiation ratio is equal to or larger than a preset threshold value. Here, if the threshold value of the single instantiation ratio is 85%, the determining unit 25 determines that the business server A calculates a hash value.

Furthermore, it is assumed that the archive device 10 received a data storage request from the business server B serving as the external device 70 as illustrated in FIG. 16A, and the threshold value of the single instantiation ratio is 85%. In this case, the determining unit 25 refers to the external-device information representing that the business server B serving as the external device has the single instantiation ratio of 30% illustrated in FIG. 15. Since the single instantiation ratio of the business server B is equal to or smaller than the single instantiation ratio, a hash determining process is performed in accordance with CPU utilization.

Specifically, the determining unit 25 determines whether the CPU utilization of the archive device 10 at a time when a data storage request is received is equal to or larger than a predetermined threshold value so as to determine whether the hash-value calculating process is to be performed using the external device 70 or the archive device 10.

Here, when the CPU utilization of the archive device 10 is equal to or larger than the predetermined threshold value, the determining unit 25 determines that the business server B serving as the external device 70 performs the hash-value calculating process. On the other hand, when the CPU utilization of the archive device 10 is smaller than the predetermined threshold value, the determining unit 25 determines that the archive device 10 performs the hash-value calculating process.

Then, the determining unit 25 stores the determination result obtained as described above in the determination-result storage unit 35. Specifically, the determining unit 25 stores information on a device to perform the hash-value calculating process in the determination-result storage unit 35.

Referring back to FIG. 14, the instructing unit 26 issues various commands to the external device 70 in accordance with the determination result stored in the determination-result storage unit 35. Specifically, when the determination-result storage unit 35 stores a determination result representing that the external device 70 performs the hash-value calculating process, the instructing unit 26 instructs the external device 70 to perform the hash-value calculating process as illustrated in FIG. 16B.

On the other hand, when the determination-result storage unit 35 stores a determination result representing that the archive device 10 performs the hash-value calculating process, the instructing unit 26 instructs the external device 70 to transmit storage request data corresponding to a storage request as illustrated in FIG. 16B.

The calculating unit 27 receives the storage request data transmitted from the data transmitting unit 83 included in the external device 70 in accordance with the instruction for transmitting the storage request data issued by the instructing unit 26, and calculates a hash value of the received storage request data. Then, the calculating unit 27 stores the calculated hash value and a data capacity in the storage-request-data-information storage unit 36. For example, the calculating unit 27 receives storage request data from the business server A as illustrated in FIG. 17, calculates a hash value of the received storage request data, and stores the calculated hash value and a data capacity in the storage-request-data-information storage unit 36.

The discriminating unit 21 according to the fourth embodiment performs, in addition to a determining process using a hash value calculated by the external device 70, a determining process performed by comparing a hash value calculated by the calculating unit 27 with attribute information stored in a second storage unit 32. Specifically, when the calculating unit 27 stores storage-request-data information, the discriminating unit 21 of the fourth embodiment determines whether attribute information including information on data having a hash value and a data capacity which are the same as those of the storage request data has been stored in the second storage unit 32. Then, the discriminating unit 21 of the fourth embodiment stores a result of the determination in the discrimination-result storage unit 33.

Procedure of Processes in Data Storing System in Fourth Embodiment

Figure 18:
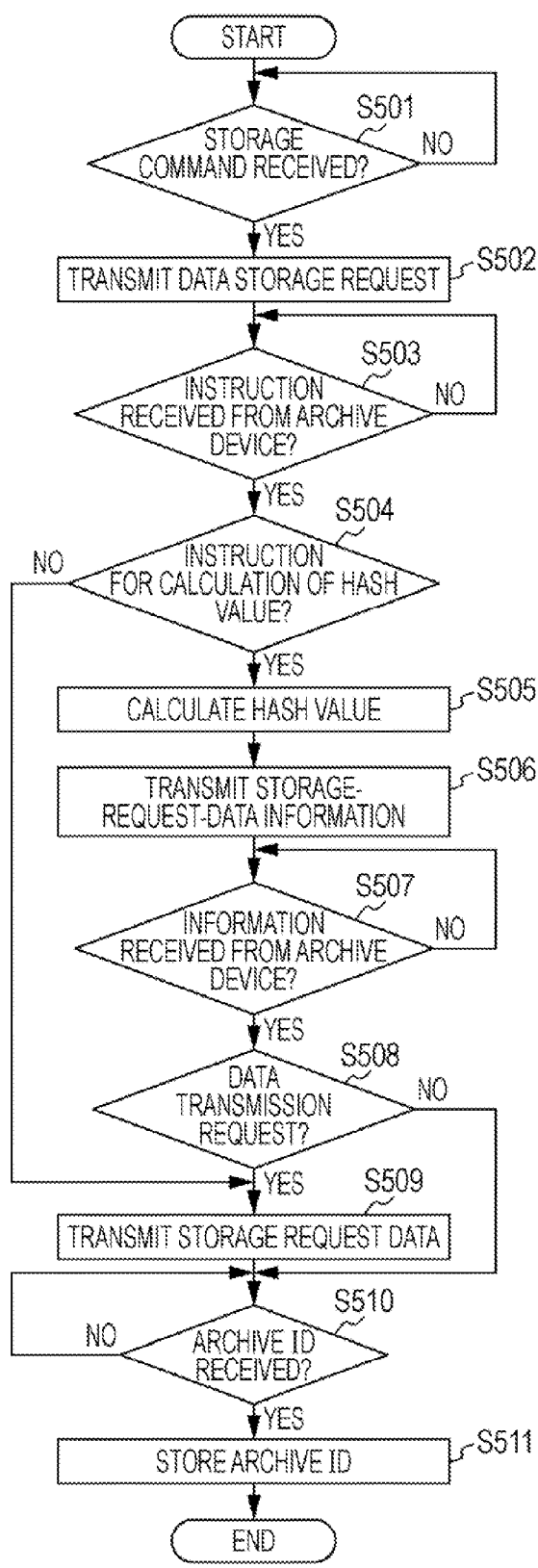
FIG. 18 is a diagram illustrating a process performed by an external device according to the fourth embodiment.
Figure 19:
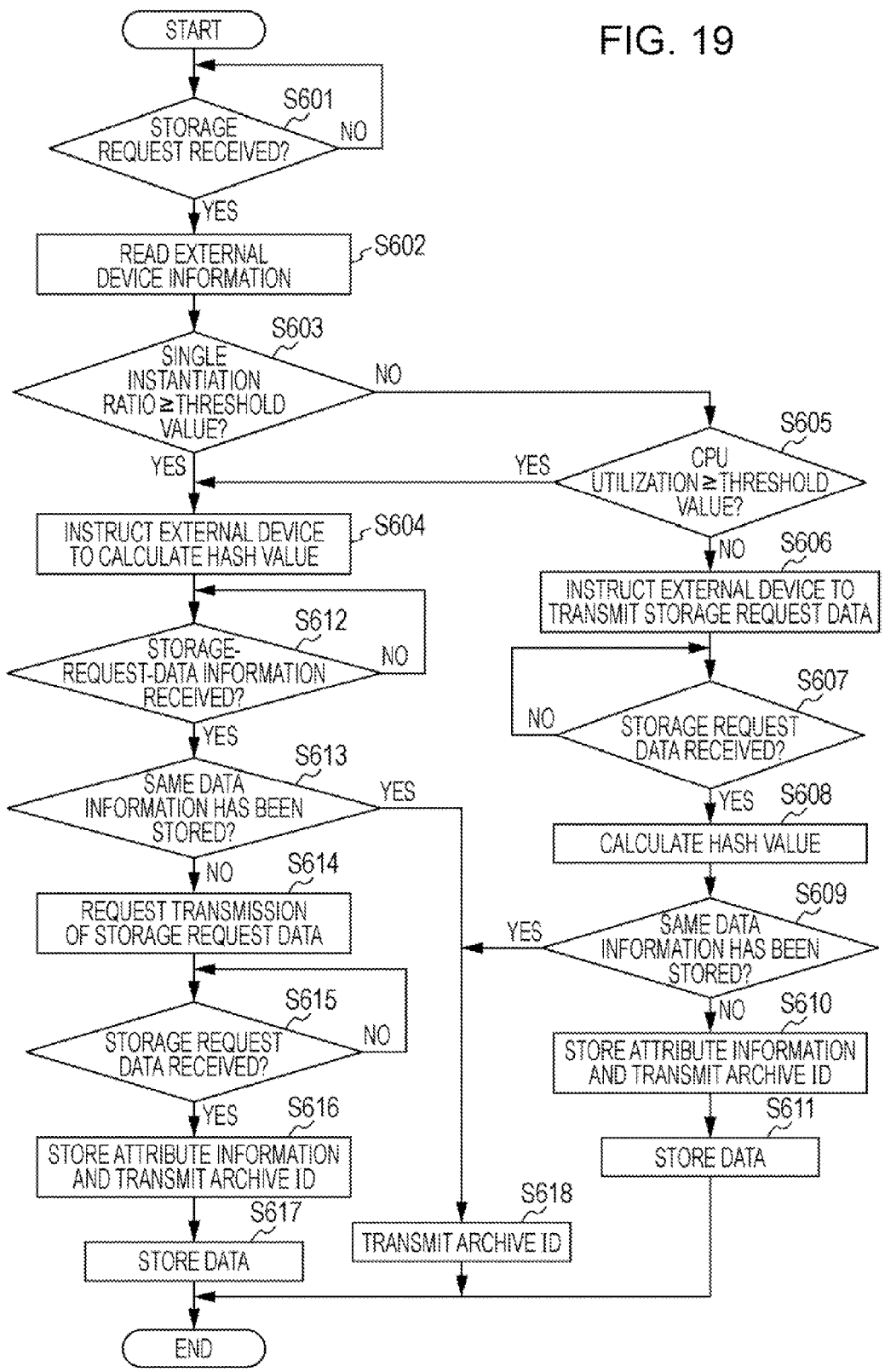
FIG. 19 is a diagram illustrating a procedure of a process performed by an archive device according to the fourth embodiment.

FIG. 18 is a diagram illustrating a process performed by the external device 70 according to the fourth embodiment. FIG. 19 is a diagram illustrating a procedure of a process performed by the archive device 10 according to the fourth embodiment. Note that processes in step S505 to step S511 illustrated in FIG. 18 are the same as the processes in step S102 to step S108 illustrated in FIG. 7, and therefore, descriptions thereof are omitted. Furthermore, processes in step S612 to step S618 are the same as the processes in step S201 to step S207 illustrated in FIG. 8, and therefore, descriptions thereof are omitted.

Procedure of Process Performed by External Device in Fourth Embodiment

As illustrated in FIG. 18, when the external device 70 of the fourth embodiment received a storage command (when a determination is affirmative in step S501), a communication unit 110 transmits a data storage request to the archive device 10 in step S502.

When receiving an instruction from the archive device 10 (when a determination is affirmative in step S503), the external device 70 of the fourth embodiment determines whether the instruction is an instruction for calculating a hash value in step S504.

When the determination is affirmative in step S504, the hash-value calculating unit 81 calculates a hash value of storage request data in step S505.

When the determination is negative in step S504, the data transmitting unit 83 transmits a storage request data to the archive device 10 in step S509.

Procedure of Process Performed by Archive Device in Fourth Embodiment

As illustrated in FIG. 19, first, when the archive device 10 received a data storage request from the external device 70 (when a determination is affirmative in step S601), the determining unit 25 reads external-device information stored in the external-device-information storage unit 34 in step S602.

Then, the determining unit 25 determines whether a single instantiation ratio of the external device 70 which transmitted the storage request is equal to or larger than a threshold value in step S603. Specifically, the determining unit 25 determines whether a ratio of requests for storing the same data performed by the external device 70 which transmitted the storage requests is larger than a threshold value.

When the determination is affirmative in step S603, the determining unit 25 determines that the external device 70 performs the hash-value calculating process. The instructing unit 26 instructs the external device 70 to calculate a hash value in step S604.

On the other hand, when the determination is negative in step S603, the determining unit 25 determines whether the CPU utilization of the archive device 10 is equal to or larger than a threshold value in step S605.

When the determination is affirmative in step S605, the determining unit 25 determines that the external device 70 performs the hash-value calculating process. The instructing unit 26 instructs the external device 70 to calculate a hash value in step S604.

On the other hand, when the determination is negative in step S605, the determining unit 25 determines that the archive device 10 performs the hash-value calculating process. Then, the instructing unit 26 instructs the external device 70 to transmit storage request data in step S606.

When the storage request data is received (when a determination is affirmative in step S607), the calculating unit 27 calculates a hash value of the received storage request data in step S608.

Thereafter, the discriminating unit 21 determines whether information on data having a hash value and a data capacity which are the same a hash value calculated by the calculating unit 27 and a data capacity of the storage request data has been stored in the second storage unit 32 in step S609.

When the determination is affirmative in step S609, the data information storage unit 23 transmits an archive ID corresponding to the data which has been stored and which is the same as the storage request data to the external device 70 serving as a transmission source of the storage request data in step S618, and the process is terminated.

On the other hand, when the determination is negative in step S609, the data information storage unit 23 generates attribute information of the storage request data, stores the generated attribute information in the second storage unit 32, and transmits an archive ID to the external device 70 in step S610.

Thereafter, a data storage unit 24 stores the storage request data received from the external device 70 in a first storage unit 31 in step S611, and the process is terminated.

Note that, in the procedure of the process described above, a case where a determination as to whether storage request data is to be newly stored in the archive device 10 is made in accordance with a hash value calculated using the entire storage request data is described. However, this embodiment is not limited to this, and as described in the third embodiment, for example, the determination as to whether storage request data is to be newly stored in the archive device 10 may be made in accordance with hash values calculated using division data items obtained by dividing storage request data.

Effect of Fourth Embodiment

As described above, according to the fourth embodiment, the determining unit 25 of the archive device 10 determines whether a hash-value calculating process is to be performed using the external device 70 or the archive device 10 in accordance with a single instantiation ratio of the external device 70 which performs a storage request. Furthermore, the determining unit 25 determines whether the hash-value calculating process is to be performed using the external device 70 or the archive device 10 in accordance with the CPU utilization of the archive device 10. Then, when the determining unit 25 determines that the external device 70 performs the hash-value calculating process, the instructing unit 26 instructs the external device 70 to execute the hash-value calculating process. Furthermore, when the determining unit 25 determines that the archive device 10 performs the hash-value calculating process, the instructing unit 26 instructs the external device 70 to transmit storage request data. Then, the calculating unit 27 calculates a hash value of the storage request data transmitted from the external device 70 in accordance with an instruction issued by the instructing unit 26. Then, the discriminating unit 21 compares the hash value calculated by the calculating unit 27 with attribute information stored in the second storage unit 32 so as to perform a determining process. Furthermore, when the instructing unit 26 instructs the external device 70 to perform the hash-value calculating process, the hash-value calculating unit 81 calculates a hash value of the storage request data. Thereafter, when the instructing unit 26 instructs the external device 70 to transmit data for a storage request, the data transmitting unit 83 transmits the storage request data to the archive device 10 which issued the instruction. Accordingly, in the data storing system according to the fourth embodiment, a transmission of data which is assumed to be the same as data which has been stored in the first storage unit 31 is avoided, and the hash-value calculating process can be performed in a distributed manner taking an operation state of the archive device 10 when a storage request is issued into consideration. Consequently, a process of storing data can be more smoothly performed.

The Other Embodiment

The first to fourth embodiments have been described. However, embodiments other than the first to fourth embodiments may be employed. Therefore, hereinafter, various embodiments categorized by (1) to (3) will be described.

(1) Single Instantiation Ratio and CPU Utilization

In the fourth embodiment described above, a case where a determination is made in accordance with the CPU utilization of the archive device 10 when a single instantiation ratio is smaller than the predetermined threshold value is described. However, this embodiment is not limited to this. The determination may be made in accordance with a single instantiation ration after a determination is made in accordance with the CPU utilization.

(2) System Configuration

Furthermore, the procedures of the processes, the specific names, the various data, and the information including the parameters described in the foregoing embodiments may be arbitrarily updated although there is an exception. For example, in this embodiment, division data items obtained by dividing storage request data in a unit of 2 MB may be used.

Furthermore, the components of the devices illustrated in the drawings are functional conceptions and are not necessarily the same as the components physically illustrated in the drawings. That is, concrete configurations of distribution and integration of the various processors and the various storage units are not limited to those illustrated in the drawings (the configuration illustrated in FIG. 2, for example). For example, the data information storage unit 23 and the data storage unit 24 may be integrated. Furthermore, the entire or arbitrary part of process functions performed by the devices may be realized by the CPU or programs which are analyzed and executed by the CPU or may be realized as hardware in accordance with a wired logic.

(3) Data Storing Program

In the fourth embodiment, the case where the various processes are realized by a hardware logic is described. However, this embodiment is not limited to this, and programs prepared in advance may be executed by a computer. Therefore, hereinafter, an example of a computer which executes a data storage program including a function the same as the function of the data storing system illustrated in the fourth embodiment described above will be described with reference to FIG. 20. FIG. 20 is a diagram illustrating a computer which performs the data storing program according to the fourth embodiment.

First, a computer which executes a data storing program so as to control an archive device 10 will be described. As illustrated in FIG. 20, a computer 1000 serving as an information processing apparatus includes a keyboard 1020, a monitor 1030, a RAM 1040, an HDD 1050, a CPU 1060, and a ROM 1070. Then, the keyboard 1020, the monitor 1030, the RAM 1040, the HDD 1050, the CPU 1060, and the ROM 1070 are connected to one another through a bus 1010, for example. Furthermore, the computer 1000 is connected to a computer 2000 through a communication unit 50 and a network 60 as illustrated in FIG. 20.

The ROM 1070 stores a data storing program which functions similarly to the function of the archive device 10 illustrated in the fourth embodiment, that is, a discriminating program 1071, a transmission request program 1072, a data-information storing program 1073, a data storing program 1074, a determining program 1075, an instructing program 1076, and a calculating program 1077 in advance. Note that these programs 1071 to 1077 may be integrated or distributed where appropriate similarly to the components included in the archive device 10 illustrated in FIG. 14.

When the CPU 1060 reads the programs 1071 to 1077 from the ROM 1070 and executes the programs 1071 to 1077, the programs 1071 to 1077 function as a discriminating process 1061, a transmission request process 1062, a data-information storing process 1063, a data storing process 1064, a determining process 1065, an instructing process 1066, and a calculating process 1067 as illustrated in FIG. 20. Note that the processes 1061 to 1067 correspond to the discriminating unit 21, the transmission requesting unit 22, the data information storage unit 23, the data storage unit 24, the determining unit 25, the instructing unit 26, and the calculating unit 27 illustrated in FIG. 14, respectively.

Furthermore, as illustrated in FIG. 20, the HDD 1050 includes first storage data 1051, second storage data 1052, discrimination-result storage data 1053, external-device-information storage data 1054, determination-result storage data 1055, and storage-request-data-information storage data 1056. The first storage data 1051, the second storage data 1052, the discrimination-result storage data 1053, the external-device-information storage data 1054, the determination-result storage data 1055, and the storage-request-data-information storage data 1056 correspond to the first storage unit 31, the second storage unit 32, the discrimination-result storage unit 33, the external-device-information storage unit 34, the determination-result storage unit 35, and the storage-request-data-information storage unit 36 illustrated in FIG. 14, respectively. Then, the CPU 1060 registers first storage data 1041, second storage data 1042, discrimination-result storage data 1043, external-device-information data 1044, determination-result storage data 1045, and storage-request-data-information storage data 1046 in the first storage data 1051, the second storage data 1052, the discrimination-result storage data 1053, the external-device-information storage data 1054, the determination-result storage data 1055, and the storage-request-data-information storage data 1056, respectively. Then, the CPU 1060 reads the first storage data 1041, the second storage data 1042, the discrimination-result storage data 1043, the external-device-information data 1044, the determination-result storage data 1045, and the storage-request-data-information storage data 1046 and stores the data in the RAM 1040. Thereafter, the CPU 1060 executes a data storing process in accordance with the first storage data 1041, the second storage data 1042, the discrimination-result storage data 1043, the external-device-information data 1044, the determination-result storage data 1045, and the storage-request-data-information storage data 1046 which have been stored in the RAM 1040.

Next, a computer which executes a data storing program so as to control an external device 70 will be described. As illustrated in FIG. 20, the computer 2000 includes a keyboard 2020, a monitor 2030, a RAM 2040, an HDD 2050, a CPU 2060, and a ROM 2070. Then, the keyboard 2020, the monitor 2030, the RAM 240, the HDD 2050, the CPU 2060, and the ROM 2070 are connected to one another through a bus 2010, for example. Furthermore, the computer 2000 is connected to the computer 1000 through a communication unit 110 and the network 60 as illustrated in FIG. 20.

The ROM 2070 stores a data storing program which functions similarly to the external device 70 illustrated in the fourth embodiment, that is, a hash-value calculating program 2071, a storage-request-data information transmitting program 2072, and a data transmitting program 2073 in advance. Note that these programs 2071 to 2073 may be integrated or distributed where appropriate similarly to the components included in the external device 70 illustrated in FIG. 14.

When the CPU 2060 reads the programs 2071 to 2073 from the ROM 2070 and executes the programs 2071 to 2073, the programs 2071 to 2073 function as a hash-value calculating process 2061, a storage-request-data information transmitting process 2062, and a data transmitting process 2063, respectively. Note that the processes 2061 to 2063 correspond to the hash-value calculating unit 81, the storage-request-data information transmitting unit 82, and the data transmitting unit 83 illustrated in FIG. 14, respectively.

Furthermore, the HDD 2050 includes data storage data 2051 and storage-request-data-information storage data 2052. The data storage data 2051 and the storage-request-data-information storage data 2052 correspond to the data storage unit 91 and the storage-request-data-information storage unit 92 illustrated in FIG. 14, respectively. The CPU 2060 registers data storage data 2041 and storage-request-data-information storage data 2042 into the data storage data 2051 and the storage-request-data-information storage data 2052, respectively. Then, the CPU 2060 reads the data storage data 2041 and the storage-request-data-information storage data 2042 and stores the data storage data 2041 and the storage-request-data-information storage data 2042 in the RAM 2040. Then, the CPU 2060 executes a data storing process in accordance with the data storage data 2041 and the storage-request-data-information storage data 2042 which have been stored in the RAM 2040.

Note that the programs 1071 to 1077 and the programs 2071 to 2073 are not necessarily stored in the ROMs 1070 and 2070 in advance. The programs may be stored in a portable physical medium such as a flexible disk, a CD-ROM, an MO disc, a DVD disc, a magneto-optical disc, or an IC card to be inserted into the computer 1000 and the computer 2000, or a fixed physical medium such as an HDD provided in the computer 1000 or outside the computer 1000. The portable physical medium and the fixed physical medium may be non-transitory. Furthermore, the programs may be stored in another computer (or server) and the like which is connected to the computers 1000 and 2000 through a public line, the Internet, a LAN, or a WAN (Wide Area Network). In this case, the computers 1000 and 2000 may read the programs from such a medium or such a computer so as to execute the programs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A non-transitory computer-readable medium storing a data storing program executed by an archive device including a first storage unit for storing data and a second storage unit for storing a hash value determined from the data, the program causing the archive device to execute a process comprising:
   storing, in the second storage unit, a ratio of storage which an external device has requested to store the same data as data in the first storage unit;
   determining whether a hash-value calculating process is to be performed by either the external device or the archive device in accordance with CPU utilization of the archive device and the ratio of storage with regard to the external device; and
   executing a first process when the determining determines the hash-value calculating process is to be performed by the external device, while executing a second process when the determining determines the hash-value calculating process is to be performed by the archive device,
   wherein the first process includes:
      instructing the external device to perform the hash-value calculating process,
      receiving a new hash value determined from the data to be stored from the external device which requests storage of the data,
      comparing the newly received hash value with the hash value stored in the second storage unit, and
      transmitting request information for transmitting the data corresponding to the newly received hash value to the external device which transmits the newly received hash value when the newly received hash value has not been stored in the second storage unit,
   wherein the second process includes:
      instructing the external device to transmit the data,
      receiving the data from the external device,
      determining the hash value from the received data,
      comparing the determined hash value with the hash value stored in the second storage unit, and
      storing the received data in the first storage unit when the determined hash value has not been stored in the second storage unit.

2. The non-transitory computer-readable medium according to claim 1, wherein the second storage unit stores volume information indicating volume of the data, and
   the process which the program causes the archive device to execute further comprising:
   receiving volume information of the data to be stored from an external device.

3. The non-transitory computer-readable medium according to claim 2, the process which the program causes the archive device to execute further comprising:
   comparing the received volume information with the volume information stored in the second storage unit.

4. The non-transitory computer-readable medium according to claim 3, the process which the program causes the archive device to execute further comprising:
   determining to store the data corresponding to the received hash value when the data specified from the received hash value and the received volume information has not been stored in the first storage unit.

5. The non-transitory computer-readable medium according to claim 1, the process which the program causes the archive device to execute further comprising:
   storing division data items including division data and a hash value of the division data to the second storage unit; and
   determining whether the hash value of the division data is the same as the received hash value of a division data item for a certain capacity among division data items that has been stored in the second storage unit,
   wherein the transmitting transmits the request information for storing the division data and the hash value corresponding to the division data.

6. A method for controlling an archive device including a first storage unit for storing data and a second storage unit for storing a hash value determined from the data, the method comprising:
   storing, in the second storage unit, a ratio of storage which an external device has requested to store the same data as data in the first storage unit;
   determining whether a hash-value calculating process is to be performed by either the external device or the archive device in accordance with CPU utilization of the archive device and the ratio of storage with regard to the external device; and
   executing a first process when the determining determines the hash-value calculating process is to be performed by the external device, while executing a second process when the determining determines the hash-value calculating process is to be performed by the archive device,
   wherein the first process includes:
      instructing the external device to perform the hash-value calculating process,
      receiving a new hash value determined from the data to be stored from the external device which requests storage of the data,
      comparing the newly received hash value with the hash value stored in the second storage unit, and
      transmitting request information for transmitting the data corresponding to the newly received hash value to the external device which transmits the newly received hash value when the newly received hash value has not been stored in the second storage unit,
   wherein the second process includes:
      instructing the external device to transmit the data,
      receiving the data from the external device,
      determining the hash value from the received data,
      comparing the determined hash value with the hash value stored in the second storage unit, and
      storing the received data in the first storage unit when the determined hash value has not been stored in the second storage unit.

7. The method according to claim 6, wherein the second storage unit stores volume information indicating volume of the data,
   the method further comprising:
   receiving volume information of the data to be stored from an external device.

8. The method according to claim 7, further comprising comparing the received volume information with the volume information stored in the second storage unit.

9. The method according to claim 8, further comprising determining to store the data corresponding to the received hash value when the data specified from the received hash value and the received volume information has not been stored in the first storage unit.

10. The method according to claim 6, further comprising:
    storing division data items including division data and a hash value of the division data to the second storage unit; and
    determining whether the hash value of the division data is the same as the received hash value of a division data item for a certain capacity among division data items that has been stored in the second storage unit,
    wherein the transmitting transmits the request information for storing the division data and the hash value corresponding to the division data.

11. A data storing system comprising:
    an archive device; and
    an external device,
    wherein the archive device includes:
        a first storage to store data;
        a second storage to store a hash value determined from the data stored in the first storage;
        a processor to execute a process including:
            storing, in the second storage unit, a ratio of storage which an external device has requested to store the same data as data in the first storage unit,
            determining whether a hash-value calculating process is to be performed by either the external device or the archive device in accordance with CPU utilization of the archive device and the ratio of storage with regard to the external device; and
            executing a first process when the determining determines the hash-value calculating process is to be performed by the external device, while executing a second process when the determining determines the hash-value calculating process is to be performed by the archive device,
        wherein the first process includes:
            instructing the external device to perform the hash-value calculating process,
            receiving a new hash value determined from data to be stored from the external device;
            comparing the newly received hash value with the hash value stored in the second storage, and
            transmitting request information for transmitting the data corresponding to the newly received hash value to the external device when the newly received hash value has not been stored in the second storage,
        wherein the second process includes:
            instructing the external device to transmit the data,
            receiving the data from the external device,
            determining the hash value from the received data,
            comparing the determined hash value with the hash value stored in the second storage unit,
            storing the received data in the first storage unit when the determined hash value has not been stored in the second storage unit,
        wherein the external device includes a processor to execute a process including:
            calculating a hash value of data to be requested to store to the archive device based on the instructing in the first process,
            transmitting a request including the calculated hash value for storing the storage request data to the archive device, and
            transmitting the data corresponding to the transmitted request to the archive device when the external device receives the request information for transmitting the data from the archive device.

12. The data storing system according to claim 11, wherein the process executed by the processor of the archive device includes:
    storing division data items including division data and a hash value of the division data to the second storage, and
    determining whether the hash value of the division data is the same as the received hash value of the division data item for a certain capacity among division data items that has been stored in the second storage,
    wherein the transmitting of request information transmits the request information for storing the division data and the hash value corresponding to the division data.

* * * * *